(12) United States Patent
Urakawa

(10) Patent No.: US 12,182,458 B2
(45) Date of Patent: *Dec. 31, 2024

(54) IMAGE FORMING APPARATUS HAVING A PLURALITY OF PORTS TO WHICH PORTABLE MEMORY IS ATTACHABLE

(71) Applicant: BROTHER KOGYO KABUSHIKI KAISHA, Nagoya (JP)

(72) Inventor: Yutaka Urakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,353

(22) Filed: Nov. 14, 2023

(65) Prior Publication Data

US 2024/0078058 A1    Mar. 7, 2024

Related U.S. Application Data

(63) Continuation of application No. 17/558,833, filed on Dec. 22, 2021, now Pat. No. 11,989,464.

(30) Foreign Application Priority Data

Jan. 5, 2021    (JP) .................................. 2021-000476

(51) Int. Cl.
   *G06F 3/12*    (2006.01)
   *H04L 9/08*    (2006.01)

(52) U.S. Cl.
   CPC .......... *G06F 3/1205* (2013.01); *G06F 3/1222* (2013.01); *G06F 3/1238* (2013.01);
   (Continued)

(58) Field of Classification Search
   None
   See application file for complete search history.

(56) References Cited

U.S. PATENT DOCUMENTS 7,958,278 B2    6/2011    Takada et al.
8,131,919 B1    3/2012    Gasser et al.
(Continued)

FOREIGN PATENT DOCUMENTS

JP    2007-18102 A    1/2007
JP    2007-76333 A    3/2007
(Continued)

OTHER PUBLICATIONS

US Office Action dated Mar. 29, 2023 from parent U.S. Appl. No. 17/558,833.
US Notice of Allowance dated Aug. 21, 2023 from parent U.S. Appl. No. 17/558,833.
Notice of Allowance dated Mar. 2, 2023 from related U.S. Appl. No. 17/558,773, filed Dec. 22, 2021.
(Continued)

*Primary Examiner* — Thomas D Lee
(74) *Attorney, Agent, or Firm* — Scully, Scott, Murphy & Presser, PC

(57) ABSTRACT

An image forming apparatus includes a controller configured to perform a portable memory using process that includes storing specific data in a dedicated memory, which is a portable memory set as a storage destination to store the specific data in the portable memory using process when attached to a dedicated port among a plurality of ports, and performing a process using the specific data stored in the dedicated memory in response to an operation received via a user interface, prior to the portable memory using process, set one of the plurality of ports as the dedicated port, in response to a portable memory being attached to a port, determine whether the portable memory is the dedicated memory and the port is the dedicated port, and provide a notification when determining that the portable memory is the dedicated memory but the port is not the dedicated port.

24 Claims, 15 Drawing Sheets

(52) U.S. Cl.
CPC .......... *G06F 3/1258* (2013.01); *G06F 3/1279* (2013.01); *G06F 3/1284* (2013.01); *H04L 9/0861* (2013.01); *H04L 9/088* (2013.01)

(56) References Cited

U.S. PATENT DOCUMENTS

| | | |
|---|---|---|
| 11,290,616 B2 | 3/2022 | Ogura |
| 11,698,762 B2 | 7/2023 | Urakawa |
| 11,989,464 B2 * | 5/2024 | Urakawa ............... H04L 9/0861 |
| 2017/0310853 A1 | 10/2017 | Gusmano |
| 2020/0382679 A1 | 12/2020 | Ogura |

FOREIGN PATENT DOCUMENTS

| | | | |
|---|---|---|---|
| JP | 2007-79702 | A | 3/2007 |
| JP | 2009-160832 | A | 7/2009 |
| JP | 2011-86227 | A | 4/2011 |
| JP | 2020-196155 | A | 12/2020 |

OTHER PUBLICATIONS

Office Action dated Nov. 22, 2023 from related U.S. Appl. No. 18/322,687, filed May 24, 2023.

Notice of Reasons for Refusal dated Aug. 6, 2024 received from the Japanese Patent Office in counterpart JP 2021-000476 together with English language translation.

Notice of Reasons for Refusal dated Aug. 6, 2024 received from the Japanese Patent Office in counterpart JP 2021-000477 together with English language translation.

\* cited by examiner

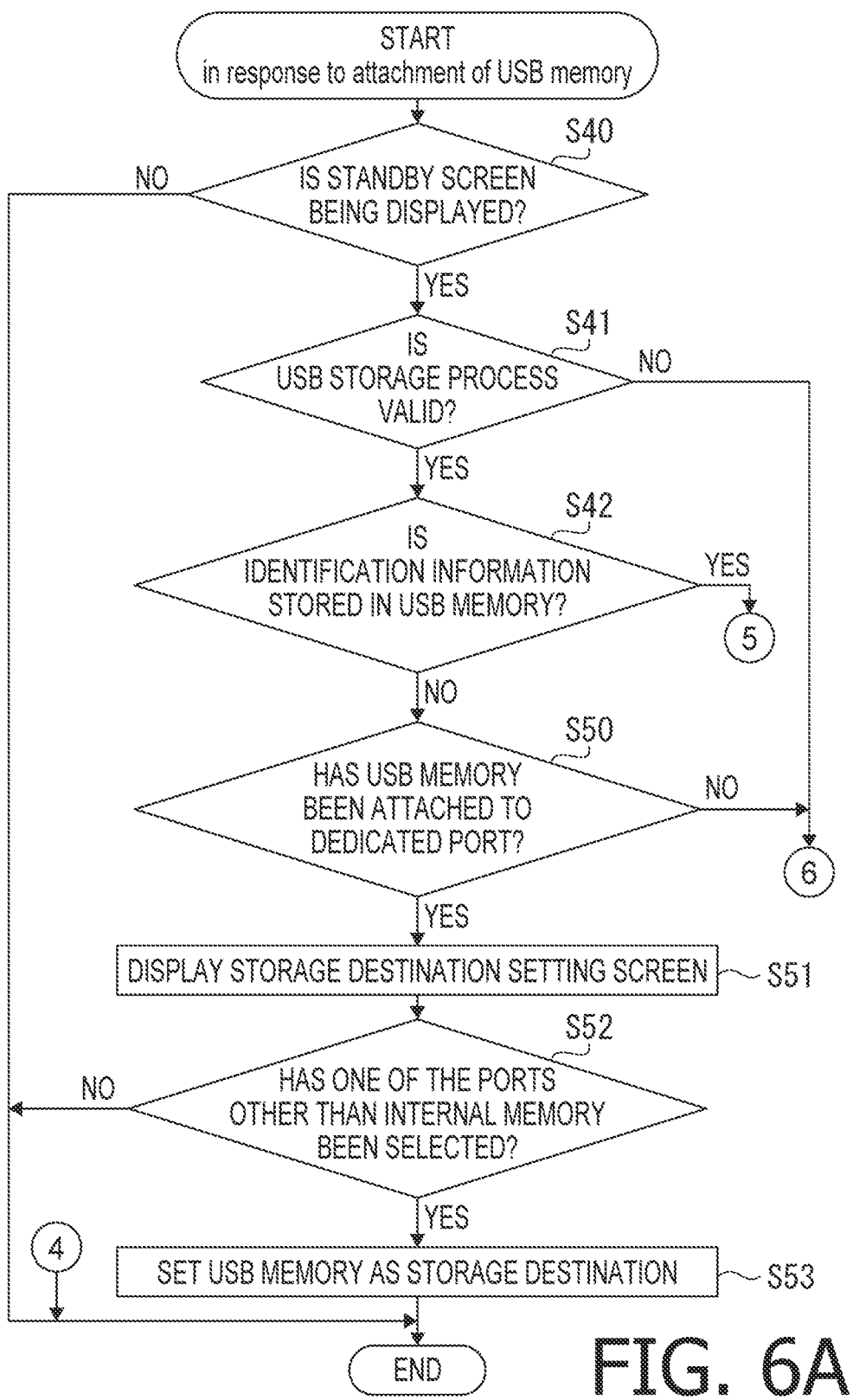

IMAGE FORMING APPARATUS HAVING A PLURALITY OF PORTS TO WHICH PORTABLE MEMORY IS ATTACHABLE

REFERENCE TO RELATED APPLICATIONS

This application is a continuation of U.S. patent application Ser. No. 17/558,833 filed on Dec. 22, 2021 that claims priority under 35 U.S.C. § 119 from Japanese Patent Application No. 2021-000476 filed on Jan. 5, 2021. The entire subject matter of the applications is incorporated herein by reference.

BACKGROUND ART

An image forming apparatus has been known that is configured to store a specific type of data in a portable memory connected with the image forming apparatus and to perform a process using the specific type of data stored in the portable memory.

SUMMARY

Nonetheless, with respect to the known image forming apparatus, there is no sufficient disclosure about a plurality of ports to which a portable memory is removably attachable. Moreover, there is no sufficient disclosure about a process to be performed when a portable memory for storing the specific type of data is attached to a port. For instance, there is no disclosure about a process to be performed when a portable memory for storing the specific type of data is attached to a port other than a port for storing print data.

Aspects of the present disclosure are advantageous to provide one or more improved techniques to improve user-friendliness of an image forming apparatus having a plurality of ports to which a portable memory is removably attachable.

According to aspects of the present disclosure, an image forming apparatus is provided, which includes a print engine, a user interface, a memory interface having a plurality of ports, each port being configured to receive a portable memory removably attached thereto, and a controller. The controller is configured to perform a portable memory using process. The controller is further configured to, prior to the portable memory using process, set one of the plurality of ports as the dedicated port, in response to a target portable memory being attached to one of the plurality of ports. The controller is further configured to, provide a notification when determining that the target portable memory is the dedicated memory but the port to which the target portable memory has been attached is not the dedicated port.

BRIEF DESCRIPTION OF DRAWINGS

FIGS. 6A to 6C are flowcharts showing a procedure of a process to be performed by the MFP in response to a USB memory being attached to a port of the MFP.

DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
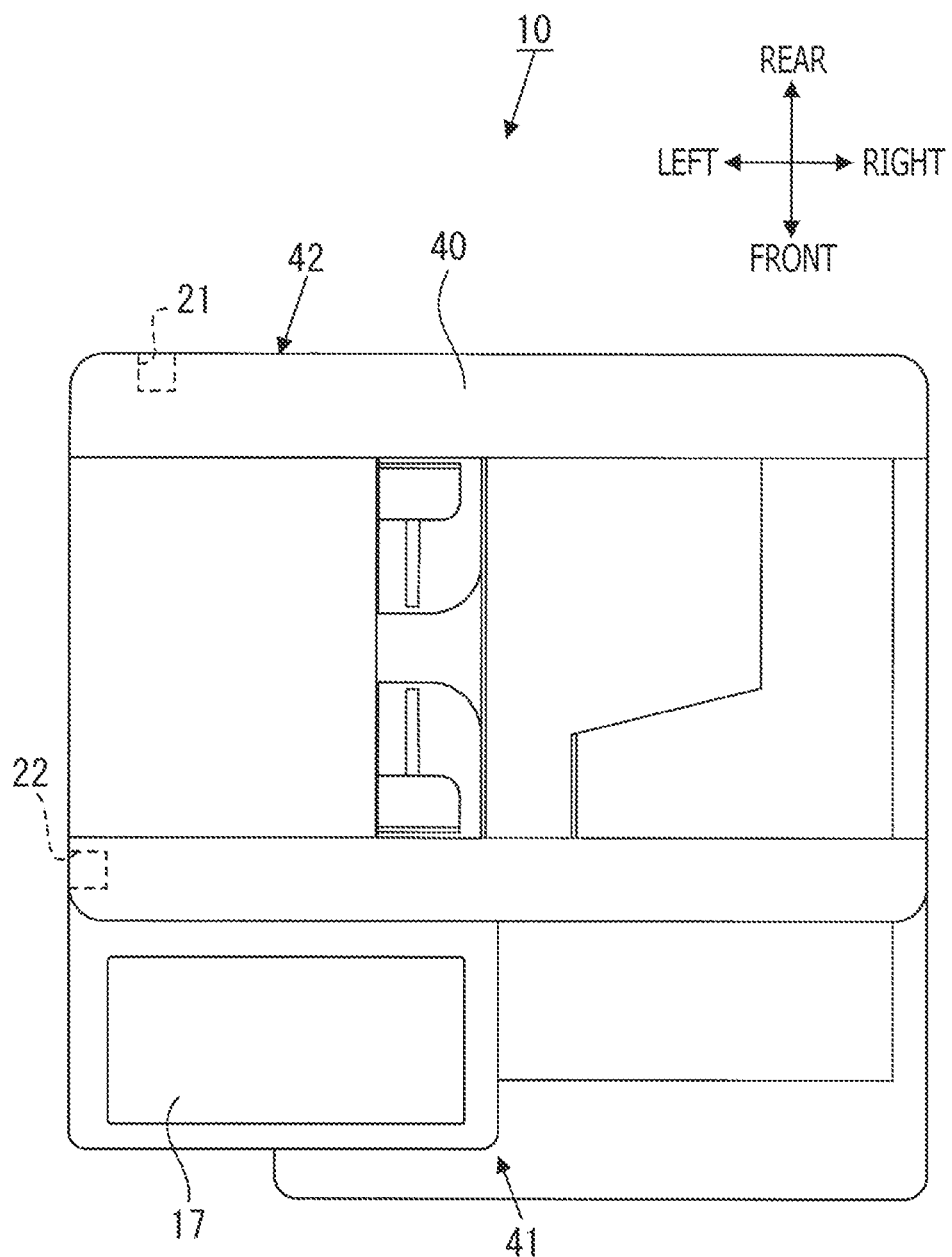
FIG. 1 is a top view of a multi-function peripheral (hereinafter referred to as an "MFP").
Figure 2:
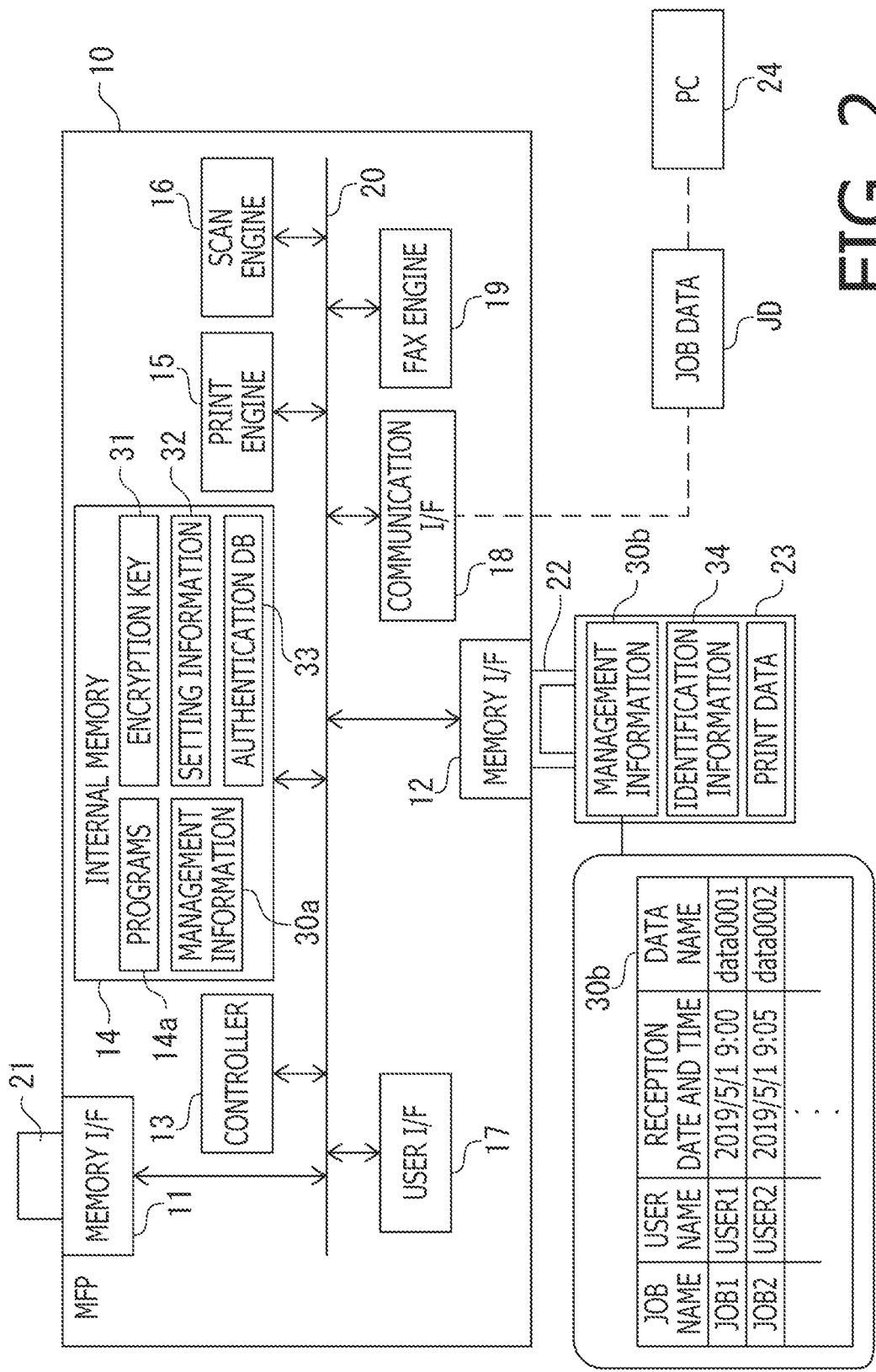
FIG. 2 is a block diagram showing a configuration of the MFP.

An illustrative embodiment according to aspects of the present disclosure will be described with reference to the accompanying drawings. FIG. 1 is a top view of an MFP ("MFP" is an abbreviation for "Multi-Function Peripheral") 10 as an example of an image forming apparatus in the illustrative embodiment according to aspects of the present disclosure. FIG. 2 is a block diagram showing an electrical configuration of the MFP 10. The MFP 10 shown in FIGS. 1 and 2 is connected with a network 200, and is communicable with a PC 24 via the network 200. The MFP 10 may be connected with the network 200 (e.g., the Internet) in a wireless or wired manner. Examples of the network 200 may include, but are not limited to, the Internet, a LAN, and a USB ("USB" is an abbreviation for "Universal Serial Bus") wired connection between the MFP 10 and the PC 24.

As shown in FIG. 2, the MFP 10 includes memory I/Fs ("I/F" is an abbreviation for "interface") 11, 12, a controller 13, an internal memory 14, a print engine 15, a scan engine 16, a user I/F 17, a communication I/F 18, a fax engine 19, and a bus 20. These elements included in the MFP 10 are communicably interconnected via the bus 20.

The user I/F 17 is an interface that intervenes between a user who directly operates the MFP 10 and the controller 13. The user I/F 17 includes, for instance, a touch panel, and operable keys as physical keys. The communication I/F 18 is an interface for connecting the MFP 10 with the network 200. The print engine 15 is configured to print an image on a recording medium such as a sheet or a disk. Applicable recording methods for the print engine 15 may include, but are not limited to, an inkjet method, and an electrophotographic method. The MFP 10 may be configured to perform a combined operation as a combination of a plurality of operations.

The memory I/Fs 11 and 12 are interfaces configured to perform communication compliant with USB specifications. The memory I/Fs 11 and 12 have ports 21 and 22 to which a USB memory 23 is removably attachable, respectively. The USB specifications applicable in the illustrative embodiment may include, but are not limited to, USB 2.0 and USB 3.0. The USB memory 23 is a portable memory configured to be removably attached to the MFP 10 via a port. Examples of the USB memory 23 may include, but are not limited to, a USB-connectable HDD, and a memory card configured to communicate with the MFP 10 via a USB-connectable card reader. At least one of the memory I/Fs 11 and 12 may have, as a port, a card slot to which a memory card is removably attachable.

As shown in FIG. 1, the port 22 of the memory I/F 12 is located at a front section 41 where the user I/F 17 is disposed, of a housing 40 of the MFP 10. Specifically, when a side of the housing 40 on which the user I/F 17 is disposed is defined as a front side of the housing 40, the front section 41 is a section that includes the said front side and front-side portions of the left and right sides of the housing 40. Further specifically, the front section 41 may be defined as a section where the user I/F 17 is disposed when the housing 40 is divided into two equal sections in a front-to-rear direction. Moreover, when the housing 40 is regarded substantially as a cube, the front section 41 may be defined as a section that includes a front surface portion of the cube at which the user I/F 17 is disposed, and left-side and right-side portions in contact with the front surface portion of the cube. In other words, the front section 41 is such a section that it is easy for the user, who is in a position to face the user I/F 17, to visually recognize that the USB memory 23 is attached to the port 22 disposed at that section. In the illustrative embodiment, the port 22 is disposed at a left-side portion of the front section 41. The port 21 of the memory I/F 11 is disposed at a rear section 42 that is located opposite to the front section 41 in the front-to-rear direction of the housing 40. Specifically, the rear section 42 may be defined as a section where the user I/F 17 is not disposed when the housing 40 is divided into two equal sections in the front-to-rear direction. Moreover, the rear section 42 may be defined as a section that includes a rear surface portion which is located opposite to the front surface portion in the front-to-rear direction of the housing 40, and a part of the housing 40 not included in the left-side and right-side portions of the front section 41 that are in contact with the front surface portion. In other words, the rear section 42 is such a section that it is difficult for the user, who is in the position to face the user I/F 17, to visually recognize that the USB memory 23 is attached to the port 21 disposed at that section.

The print engine 15 is configured to discharge a printed sheet with an image formed thereon, in a discharge direction (specifically, in the frontward direction) along the front-to-rear direction shown in FIG. 1. Namely, the front side is a discharge side toward which the printed sheet is discharged. Further, in this case, the front section 41 may be defined as a half section of the housing 40 that is located on the discharge side in the discharge direction for the printed sheet. However, it is noted that the MFP 10 may be configured to change a setting for the discharge direction. Specifically, when the setting for the discharge direction is changed, a printed sheet with an image formed thereon by the print engine 15 may be discharged in the rearward direction along the front-to-rear direction. In this case, a rear cover (not shown) of the rear section 42 may be opened to discharge the printed sheet rearward. When the MFP 10 is set to discharge the printed sheet frontward, and the USB memory 23 is attached to the port 21 of the memory I/F 11 of the rear section 42, the USB memory 23 protrudes rearward from the housing 40. Namely, the memory I/F 11 is configured in such a manner that the USB memory 23, when attached to the port 21, protrudes from the housing 40 in a direction opposite to the discharge direction (i.e., the frontward direction). In another instance, the memory I/F 11 may be configured in such a manner that the USB memory 23, when attached to the port 21, protrudes from the housing 40 in a direction orthogonal to the discharge direction. In this case, when the housing 40 is divided into two equal sections in the left-to-right direction, the port 21 of the memory I/F 11 may be disposed at one section (e.g., a right section), of the two equal sections, which is located opposite in the left-to-right direction to the other section (e.g., a left section) where the port 22 of the memory I/F 12 is disposed. Further, the port 21 of the memory I/F 11 may be disposed at one section (e.g., the right section), of the two equal sections, which is located opposite to the other section (e.g., the left section) where the user I/F 17 having the touch panel is disposed, in the left-to-right direction.

The scan engine 16 is configured to convey a document sheet to be scanned, in a conveyance direction along the left-to-right direction. When viewed from the top of the housing 40, the scan engine 16 is located shifted toward the rear section 42 rather than the front section 41 relative to a center line of the housing 40 in the front-to-rear direction, which is orthogonal to the conveyance direction for the document sheet to be scanned. In this case, when viewed from the top of the housing 40, the port 21 of the memory I/F 11 is disposed at the rear section 42 toward which the scan engine 16 is shifted relative to the center line of the housing 40 in the front-to-rear direction.

The MFP 10 includes a sheet tray (not shown) configured to support one or more sheets placed thereon that are used for printing by the print engine 15. The sheet tray is configured to be pulled out in a pull-out direction (specifically, in the frontward direction) along the front-to-rear direction, to supply sheets. In this case, the port 21 of the memory I/F 11 is disposed at the rear section 42 that is located opposite to the front section 41 in the pull-out direction for the sheet tray.

The MFP 10 includes a front cover (not shown) disposed at the front section 41. The front cover is configured to be opened frontward for replacement of a toner cartridge for storing toner used for printing by the print engine 15. The toner cartridge to be replaced is withdrawn in a withdrawal direction (specifically, in the frontward direction) along the front-to-rear direction out of the housing 40 with the front cover being open. In this case, the port 21 of the memory I/F 11 is disposed at the rear section 42 that is located opposite to the front section 41 in the withdrawal direction in which the toner cartridge to be replaced is withdrawn.

The controller 13 may include at least one of processors such as a CPU and an ASIC ("ASIC" is an abbreviation for "Application Specific Integrated Circuit"). The internal memory 14 may include at least one of storage devices such as a RAM, a ROM, an SSD, and an HDD. The internal memory 14 may include a buffer of the controller 13 that is used in executing computer programs. The internal memory 14 may include a non-transitory computer-readable storage medium. Examples of the non-transitory computer-readable storage medium may include, but are not limited to, recording media such as a CD-ROM and a DVD-ROM, as well as the aforementioned various types of storages. Moreover, the non-transitory computer-readable storage medium is a tangible medium. On the other hand, an electrical signal carrying a program downloaded, e.g., from a server on the Internet, is a computer-readable signal medium, but is not included in the examples of the non-transitory computer-readable storage medium.

The internal memory 14 stores programs 14a executable by the controller 13. The illustrative embodiment basically shows processes to be performed by the controller 13 in accordance with instructions described in the programs 14a. Namely, each of processes such as "determining," "judging," "extracting," "selecting," "calculating," "specifying," "identifying," "obtaining," "acquiring," "receiving," "accepting," and "controlling" in the following description may represent a process by the controller 13. It is noted that "obtaining" or "acquiring" may be used as a concept that does not necessarily require a request. Namely, a process of receiving data without the controller 13 making a request for the data may be included in a concept of "the controller 13 obtaining (acquiring) data." Further, "data" in the present disclosure may be expressed in a computer-readable bit sequence. Additionally, a plurality of pieces of data having substantially the same meaning or content but expressed in different formats shall be treated as the same data. The same may apply to "information" in the present disclosure.

The internal memory 14 has a data storage area in which management information 30, encryption key 31, setting information 32, and authentication DB 33 are stored. The management information 30, the encryption key 31, the setting information 32 and the authentication DB 33 will be described later in detail. As will be described below, the "management information 30" is also stored in the USB memory 23. Therefore, when it is required to distinguish between the management information 30 stored in the internal memory 14 and the management information 30 stored in the USB memory 23, the alphabet characters "a," and "b" are added to the end of the reference numeral thereof. Namely, the management information stored in the internal memory 14 is represented with reference characters "30a" added, and the management information stored in the USB memory 23 is represented by reference characters "30b" added.

Next, a configuration of the PC 24 will be described. The PC 24 includes a communication I/F, a memory, and a controller, which are not shown in any of the drawings. Respective configurations of the above elements included in the PC 24 are substantially the same as those of the communication I/F 18, the internal memory 14, and the controller 13 included in the MFP 10. The PC 24 may generate job data JD by a function of an application program stored in the memory. The job data JD is data for causing the MFP 10 to perform printing. In the illustrative embodiment, the job data JD contains PJL ("PJL" is an abbreviation for "Printer Job Language") data and PDL ("PDL" is an abbreviation for "Page Description Language") data. The PJL data is data described in Printer Job Language. The PDL data is data described in Page Description Language. Examples of the PDL data may include, but are not limited to, PS ("PS" is an abbreviation for "Post Script") data, PCL ("PCL" is an abbreviation for "Printer Command Language") data, JPEG ("JPEG" is an abbreviation for "Joint Photographic Experts Group") data, and GDI ("GDI" is an abbreviation for "Graphic Device Interface") data.

Figure 3A:
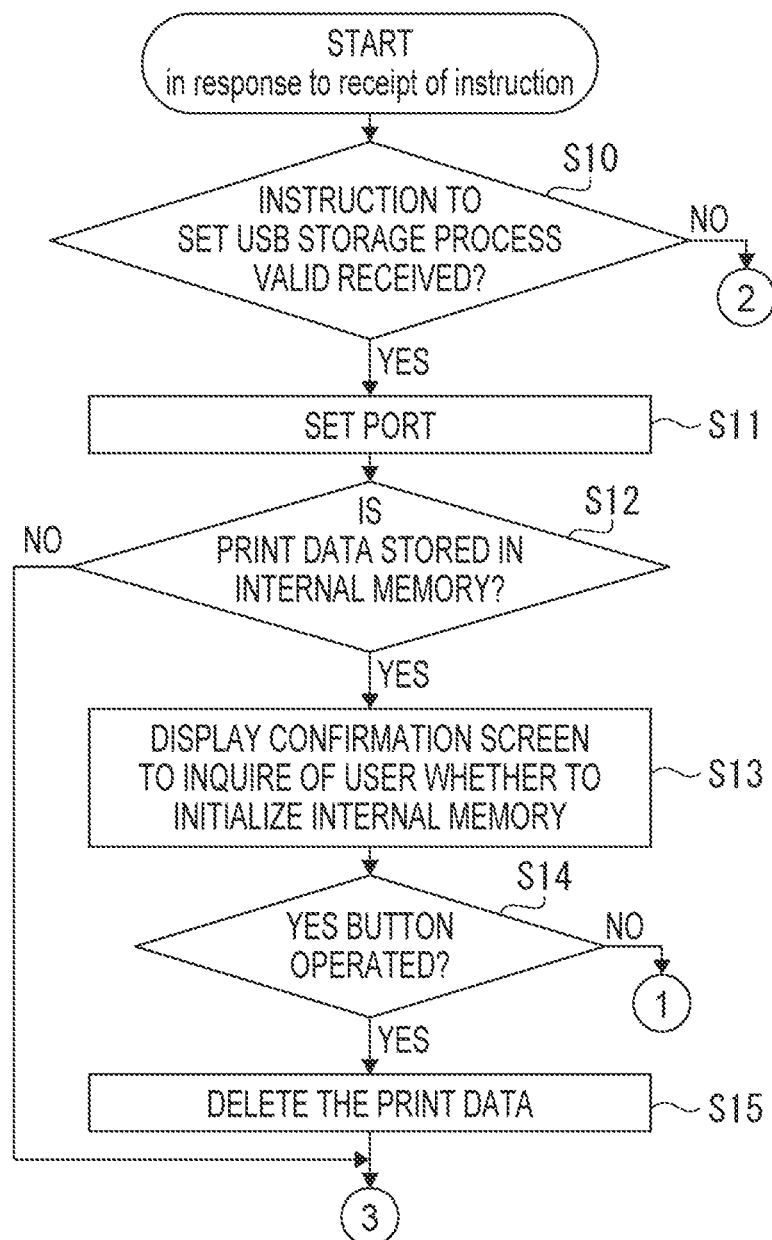
FIGS. 3A to 3C are flowcharts showing a procedure of a process to set a storage destination for print data.
Figure 3B:
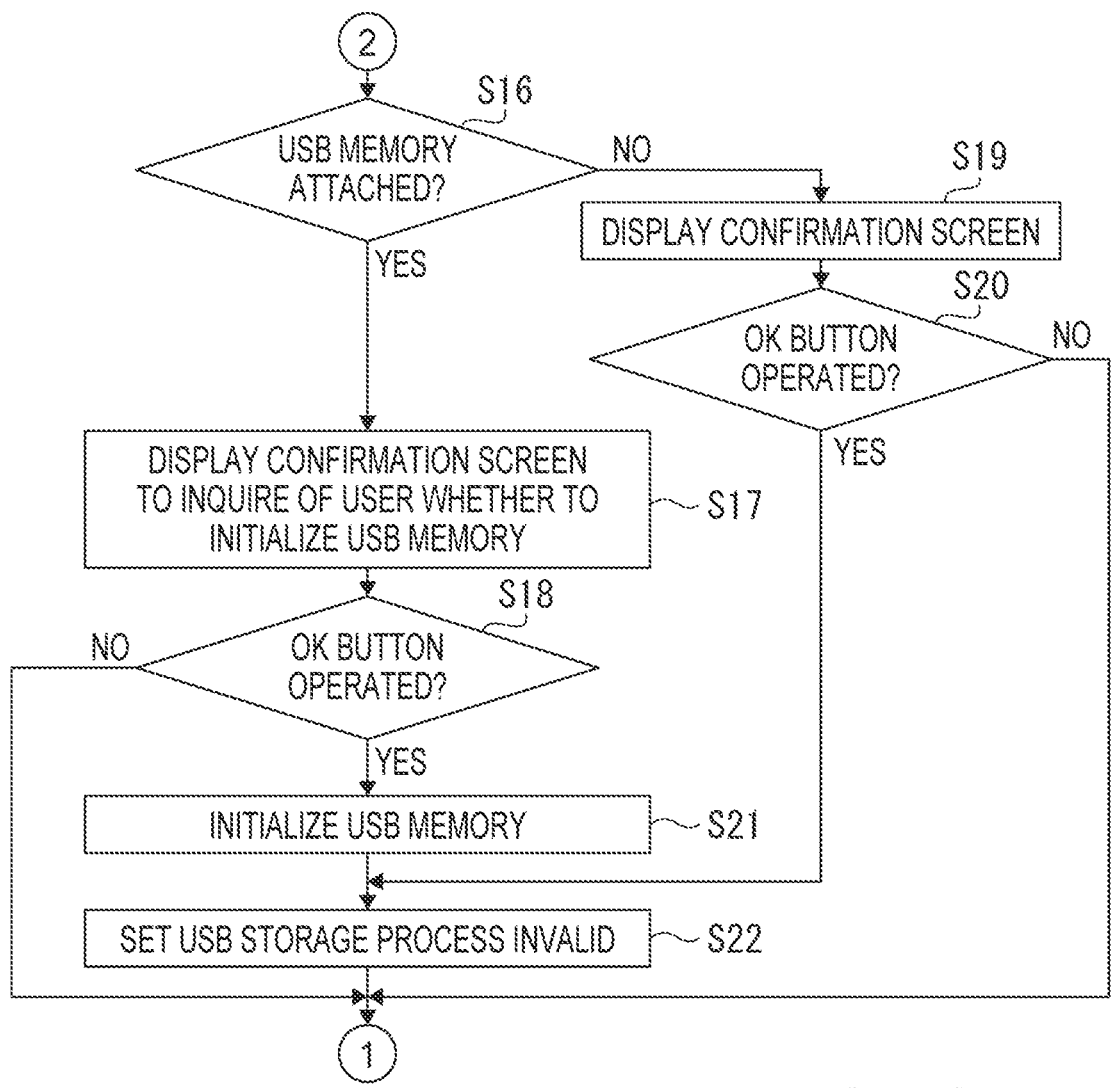
Figure 3C:
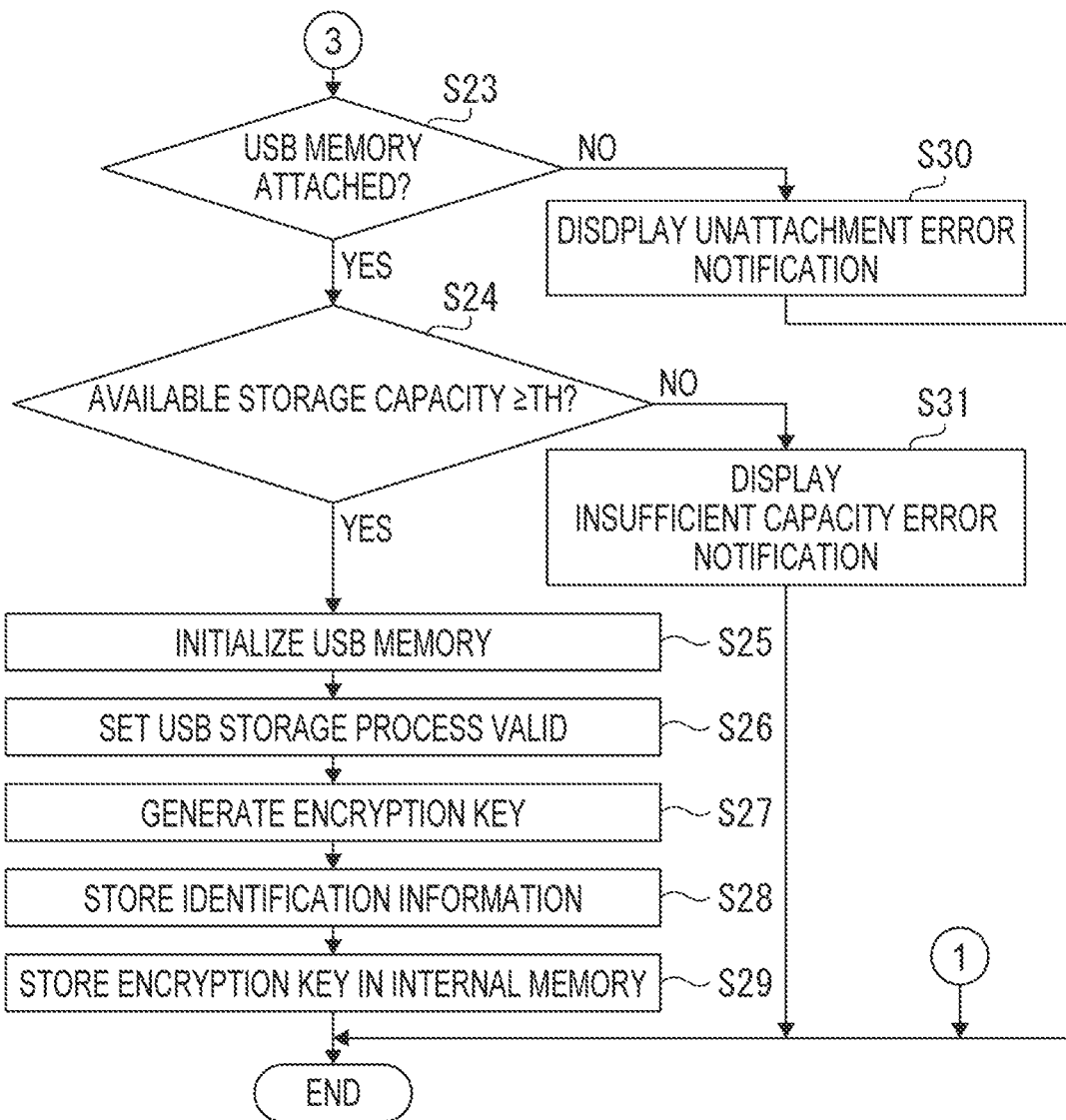

Referring to FIGS. 3A to 3C, an explanation will be provided of a procedure of a process to set a memory as a storage destination in a storage printing function. The storage printing function is a function to store print data corresponding to received job data JD in a memory set as a storage destination, and cause the print engine 15 to print the print data stored in the memory set as the storage destination in response to an operation received via the user I/F 17. The storage printing function includes a first storage printing function for job data JD with a PIN code and a second storage printing function for job data JD with a user name. The first storage printing function is set valid at the time of factory shipment of the MFP 10. The second storage printing function is switchable to be valid or invalid in response to an external instruction. When having switched the second storage printing function to be valid in response to a user instruction, the controller 13 sets the first storage printing function invalid. Meanwhile, when having switched the second storage printing function to be invalid in response to a user instruction, the controller 13 sets the first storage printing function valid. In the storage printing function, when a USB storage process is set valid, the print data may be stored in the USB memory 23. On the other hand, when the USB storage process is set invalid, the print data may be stored in the internal memory 14.

Figure 4:
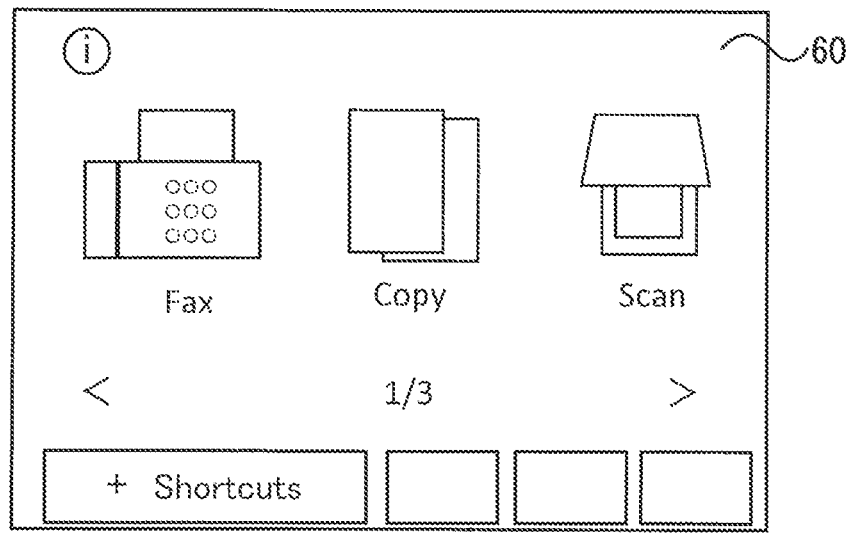
FIG. 4 shows an example of a standby screen displayed on the MFP.

Referring to FIGS. 3A to 3C, an example case will be described in which the port 22 is set as a port to which the USB memory 23 as a storage destination is to be attached. The process shown in FIGS. 3A to 3C may be performed by the controller 13 executing one or more programs 14a stored in the internal memory 14. The controller 13 performs the process shown in FIGS. 3A to 3C in response to receipt of an instruction to make a transition of the display on the user I/F 17 to a setting screen for the storage printing function in response to an operation onto a standby screen 60 shown in FIG. 4. The standby screen 60 is a screen for receiving selection instructions for various functions of the MFP 10. The standby screen 60 is displayed on the user I/F 17 to wait for an instruction to be input, after the MFP 10 is powered on or after completion of each process by the MFP 10.

First, an explanation will be provided of an example situation where the USB storage process is switched from an invalid status to a valid status. In the following description, each step included in each process will be represented with "S" added in front of a corresponding reference numeral. In S10, the controller 13 determines whether to set the USB storage process valid. Specifically, after making a transition of the display on the user I/F 17 from the standby screen 60 to the setting screen for the storage printing function, in response to receiving an instruction to set the USB storage process valid via the setting screen, the controller 13 determines to set the USB storage process valid (S10: Yes).

Figure 5:
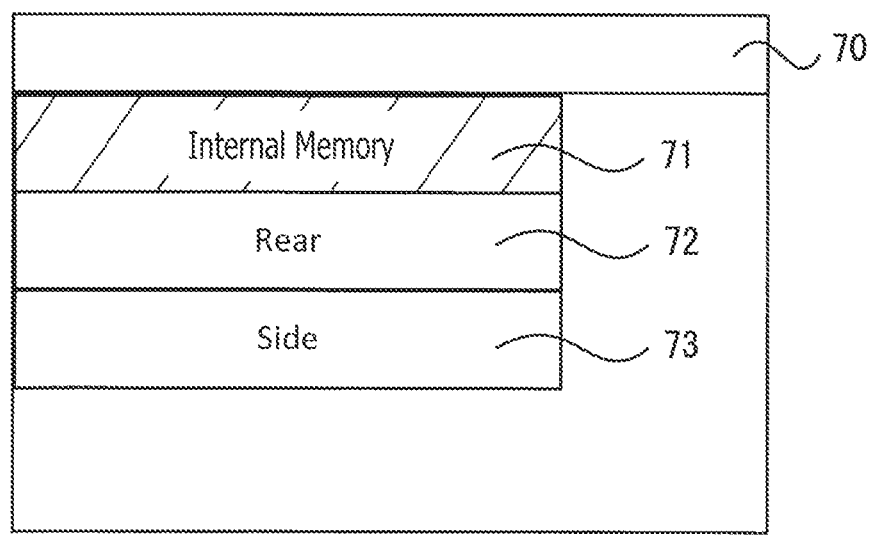
FIG. 5 shows an example of a storage destination setting screen displayed on the MFP.

In S11, the controller 13 sets a port to which the USB memory 23 as a storage destination for print data is to be attached. Specifically, the controller 13 displays a storage destination setting screen 70 (see FIG. 5) in response to an operation onto the user I/F 17. The storage destination setting screen 70 includes designation buttons 71, 72, and 73 to receive a selection from among available storage destinations for print data, i.e., the internal memory 14 (indicated with "Internal Memory" in FIG. 5), the port 21 (indicated with "Rear" in FIG. 5), and the port 22 (indicated with "Side" in FIG. 5). Each of the designation buttons 71, 72, and 73 is a button to be operated to select a corresponding one of the available storage destinations for print data. A designation button corresponding to a currently-set storage destination is displayed in a different color from a color of the other designation buttons. In FIG. 5, the designation button 71 displayed in the different color is indicated as a shaded area. The setting information 32 is updated according to the operation of the designation buttons 71, 72, and 73. The setting information 32 is information indicating a port (i.e., the "Rear" port 21 or the "Side" port 22) to which the USB memory 23 set as the storage destination for print data is to be attached, or the internal memory 14.

In S12, the controller 13 determines whether print data is stored in the internal memory 14 that had been set as the storage destination before the port setting in S11. When determining that no print data is stored in the internal memory 14 (S12: No), the controller 13 proceed to S23. Meanwhile, when determining that print data is stored in the internal memory 14 (S12: Yes), the controller 13 proceed to S13. In S13, the controller 13 causes the user I/F 17 to display a confirmation screen to inquire of the user whether to initialize the internal memory 14.

In S14, the controller 13 determines whether a "YES" button has been operated on the confirmation screen. When determining that the "YES" button has been operated on the confirmation screen (S14: Yes), the controller 13 proceeds to S15 to delete the print data stored in the internal memory 14. This is because of the following reasons. The memory set as the storage destination in the USB storage process is supposed to be used for storing print data of a specific user or a group to which the specific user belongs. Therefore, it is preferable not to mix print data to be newly stored with print data that has been stored from when the internal memory 14 was previously used as the storage destination for print data. Meanwhile, when determining that the "YES" button has not been operated on the confirmation screen (S14: No), the controller 13 terminates the process shown in FIGS. 3A to 3C. In this case, the controller 13 maintains the memory currently set as the storage destination for print data, without changing it to the memory newly set in S11 as the storage destination for print data. It is noted that the controller 13 may not delete the print data stored in the internal memory 14 in setting the USB storage process valid, but may move the print data stored in the internal memory 14 into the USB memory 23 that is to be the storage destination after the USB storage process is set valid.

In S23, the controller 13 determines whether the USB memory 23 is attached to the port set in S11. Specifically, the controller 13 determines whether the USB memory 23 is attached to the port indicated by the setting information 32 stored in the internal memory 14. When determining that the USB memory 23 is not attached to the port set in S11 (S23: No), the controller 13 proceeds to S30. In S30, the controller 13 causes the user I/F 17 to display an unattachment error notification representing that the USB memory 23 is not attached to the port set in S11. Specifically, for instance, the controller 13 causes the user I/F 17 to display an unattachment error screen that includes a message for prompting the user to attach the USB memory 23 to the port set in S11 and a close button. When detecting that the close button has been selected on the unattachment error screen displayed in S30, the controller 13 erases the unattachment error screen and terminates the process shown in FIGS. 3A to 3C.

When determining that the USB memory 23 is attached to the port set in S11 (S23: Yes), the controller 13 proceeds to S24. In S24, the controller 13 determines whether an available storage capacity of the USB memory 23 attached to the port set in S11 is equal to or more than a threshold TH. This is because there is a concern that if the available storage capacity of the USB memory 23 to be used in the USB storage process is small, the USB memory 23 may be unable to sufficiently store print data. This is also because if the available storage capacity of the USB memory 23 is small, it may cause a larger number of read/write operations per unit storage area of the USB memory 23 and may result in a higher risk of causing a failure of the USB memory 23. For instance, the threshold TH used for the determination in S24 is 8 GB. When determining that the available storage capacity of the USB memory 23 attached to the port set in S11 is less than the threshold TH (S24: No), the controller 13 goes to S31. In S31, the controller 13 displays an insufficient capacity error notification representing that the available storage capacity of the USB memory 23 attached to the set port is insufficient. Afterward, the controller 13 terminates the process shown in FIGS. 3A to 3C.

When determining that the available storage capacity of the USB memory 23 attached to the port set in S11 is equal to or more than the threshold TH (S24: Yes), the controller 13 proceeds to S25 to initialize the USB memory 23 attached to the port. Specifically, for instance, the controller 13 may delete all data in the USB memory 23. In another instance, the controller 13 may format the storage area of the USB memory 23. Prior to the initialization of the USB memory 23 in S25, the controller 13 may cause the user I/F 17 to display a confirmation screen to confirm that the USB memory 23 is to be initialized. In this case, when the initialization of the USB memory 23 has been selected on the confirmation screen, the controller 13 may proceed to S25. Meanwhile, when the initialization of the USB memory 23 has not been selected on the confirmation screen, the controller 13 may terminate the process shown in FIGS. 3A to 3C.

In S26, the controller 13 sets the USB storage process valid. To set the USB storage process valid, the controller 13 sets a validity determination flag representing the status of the USB storage process to a value representing that the USB storage process is set valid, and stores the set validity determination flag in the internal memory 14. In addition, the controller 13 stores the setting information 32 in the internal memory 14. When the USB storage process is set valid, the setting information 32 represents a value (specifically, "Rear" or "Side") indicating a port (i.e., the "Rear" port 21 or the "Side" port 22) to which the USB memory 23 set as the storage destination for print data is to be attached.

In S27, the controller 13 generates an encryption key 31. The encryption key 31 is information used to encrypt and decrypt the print data and the management information 30 stored in the USB memory 23 attached to the port. Each time the USB storage process is set valid, the controller 13 generates a new encryption key. Hereinafter, the port set as a dedicated port for the USB storage process may be referred to simply as a "dedicated port."

In S28, the controller 13 stores the identification information 34 in the USB memory 23 attached to the port. The identification information 34 is information representing that the USB memory 23 with the identification information 34 stored therein is set as the storage destination for print data in the USB storage process. Specifically, the controller 13 generates the management information 30b, and encrypts the management information 30b with the encryption key 31 generated in S27, thereby generating the identification information 34. It is noted that the management information 30b encrypted in S28 does not contain any information recorded about the print data. Hereinafter, the USB memory 23, which has been set as the storage destination for print data by the identification information 34 being stored therein, may be referred to simply as a "dedicated memory," to differentiate it from another USB memory 23.

In S29, the controller 13 stores, into the internal memory 14, the encryption key 31 used to generate the identification information 34 in S28. Namely, the encryption key 31 is information paired with the identification information 34. After completion of S29, the controller 13 terminates the process shown in FIGS. 3A to 3C.

Next, an explanation will be provided of an example situation where the USB storage process is switched from the valid status to the invalid status. When determining to not set the USB storage process valid (S10: No), the controller 13 proceeds to S16. In S16, the controller 13 determines whether the USB memory 23 is attached to the port currently in use for the USB storage process. When determining that the USB memory 23 is attached to the port currently in use for the USB storage process (S16: Yes), the controller 13 proceeds to S17. In S17, the controller 13 causes the user I/F 17 to display a confirmation screen to confirm that the USB memory 23 attached to the port is to be initialized. The confirmation screen includes a message representing that all the data in the USB memory 23 is to be deleted and that the role of the USB memory 23 as the storage destination for print data is to be set invalid. The confirmation screen further includes an OK button to receive an instruction to start initializing the USB memory 23, and a cancel button to receive an instruction to cancel the initialization of the USB memory 23.

In response to detecting in S18 that the OK button on the confirmation screen has been operated, the controller 13 proceeds to S21 to initialize the USB memory 23 currently attached to the port. The process of S21 is substantially the same as the process of S25. In S22, the USB storage process is set invalid. Specifically, the controller 13 changes the value of the validity determination flag stored in the internal memory 14 to a value representing that the USB storage process is set invalid. Thereby, the MFP 10 is brought into a state where the USB storage process is set invalid, and in the storage printing function, the storage destination for print data is set to the internal memory 14. It is noted that in S22, for instance, the controller 13 may delete only the print data and the management information 30 among the data in the USB memory 23. In another instance, in setting the USB storage process invalid in S22, the controller 13 may not delete the print data and the management information 30 in the USB memory 23, but may move the print data and the management information 30 into the internal memory 14.

In substantially the same manner as in S22 where the USB storage process is set invalid, when switching one function to the valid status and the other function to the invalid status between the first storage printing function and the second storage printing function, the controller 13 deletes the print data that has been stored in the USB memory 23 through the USB storage process in the function (i.e., the first storage printing function or the second storage printing function) set invalid. This is because of the following reasons. Between the first storage printing function and the second storage printing function, information (e.g., a user name and a PIN code) required in the below-mentioned step S87 is different. Therefore, if the print data is left stored in the USB memory 23, for instance, it may produce a negative effect that print data remains unprintable. In this case, the information indicating the dedicated port and the dedicated memory is not deleted. Thereby, it is possible to use the already-set USB storage process as is even after switching one function to the valid status and the other function to the invalid status between the first and second storage printing functions.

When determining that the USB memory 23 is not attached to the port currently in use for the USB storage process (S16: No), the controller 13 proceeds to S19 to display a confirmation screen on the user I/F 17. The confirmation screen displayed in S19 includes a message representing that the USB memory 23 is not attached to the port, and buttons (e.g., an OK button and a cancel button) for receiving selection instructions as to whether to set the USB storage process invalid.

In S20, the controller 13 determines whether the OK button has been operated on the confirmation screen. When determining that the OK button has been operated on the confirmation screen (S20: Yes), the controller 13 proceeds to S22 to set the USB storage process invalid. Then, the controller 13 terminates the process shown in FIGS. 3A to 3C. When determining that the OK button has not been operated on the confirmation screen (S20: No), the controller 13 terminates the process shown in FIGS. 3A to 3C.

Figure 6B:
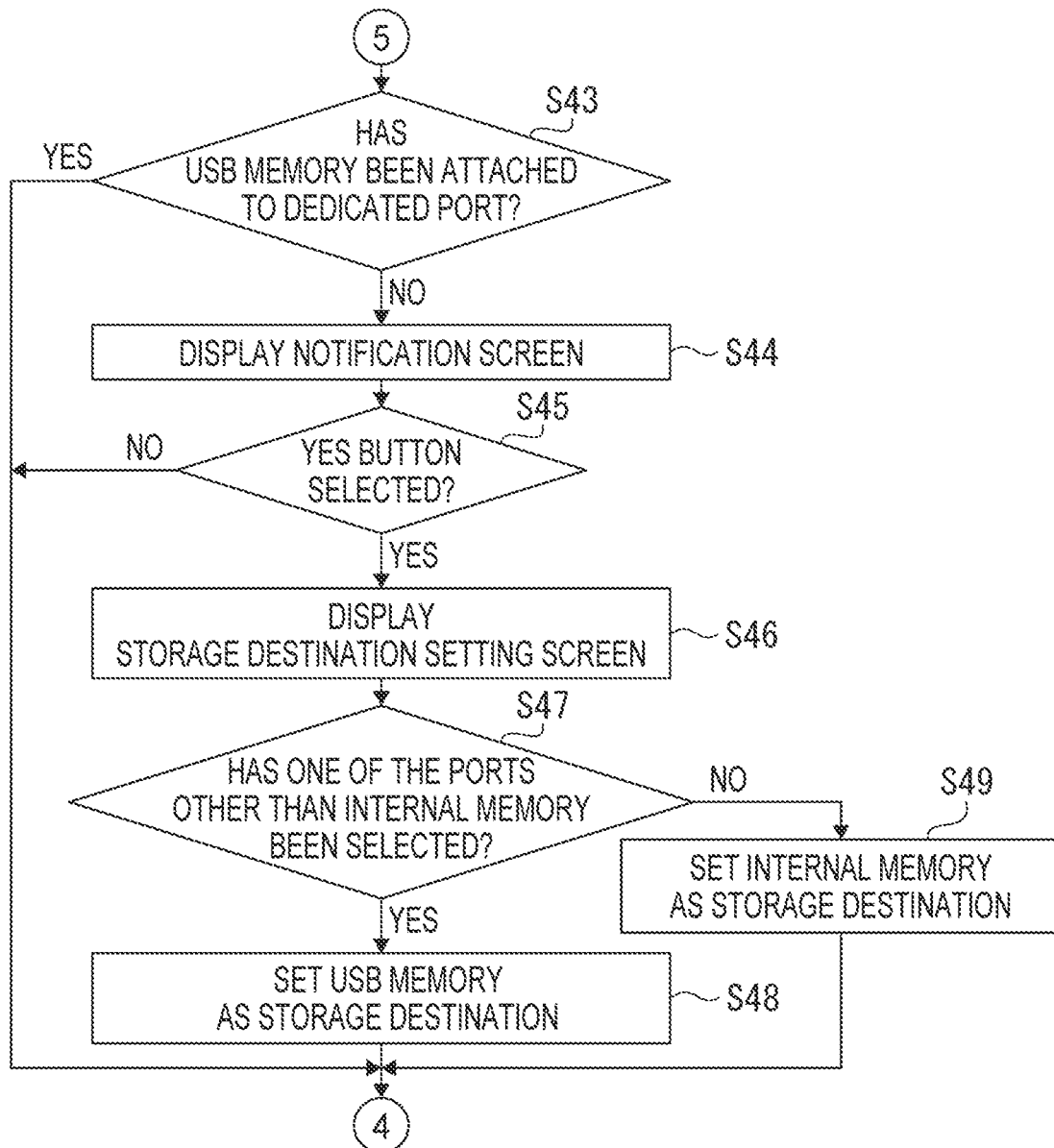
Figure 6C:
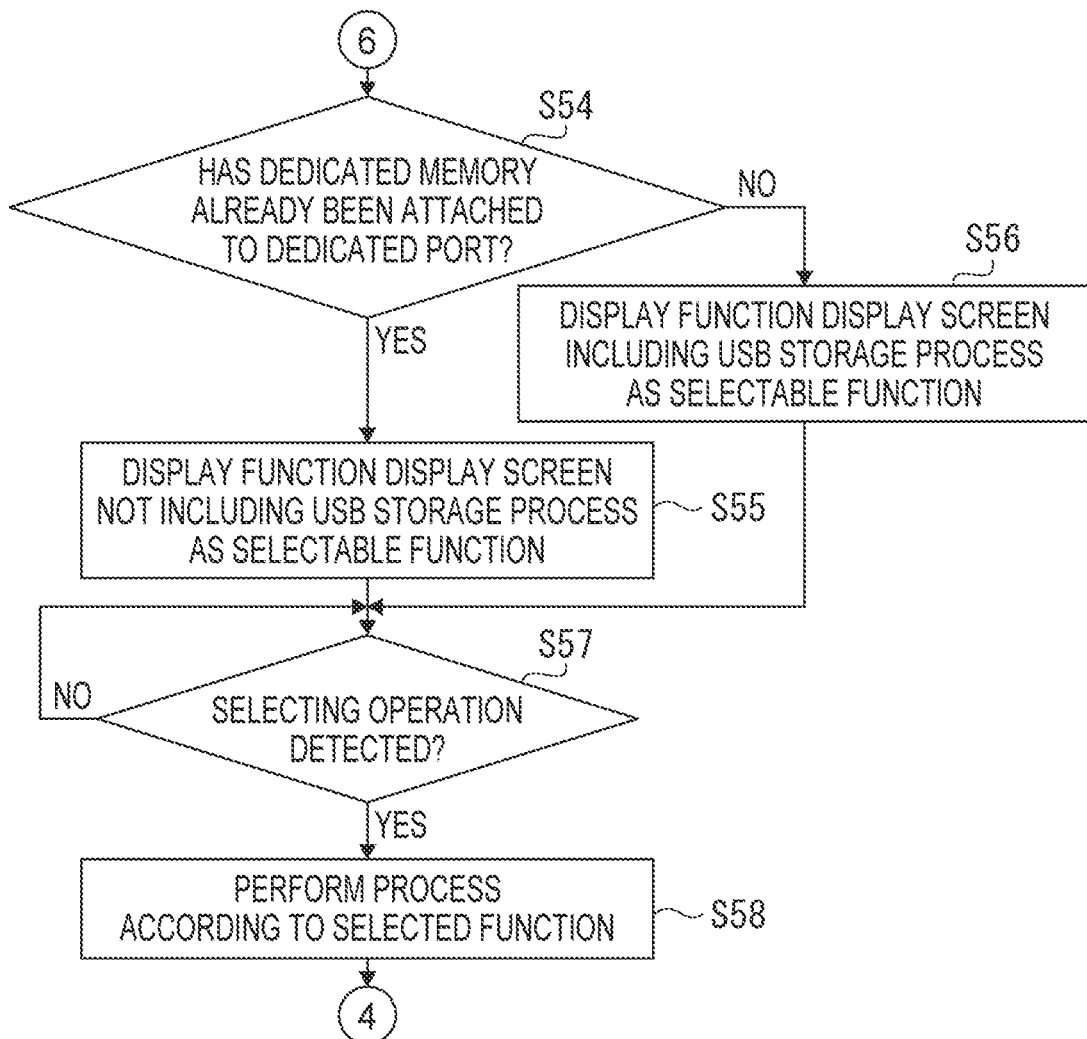

Next, a procedure of a process to be performed by the controller 13 in response to the USB memory 23 being attached to a port will be described with reference to FIGS. 6A to 6C. The attachment of the USB memory 23 is also detected when the MFP 10 is powered on with the USB memory 23 being attached to the port 21 or the port 22. Therefore, in this case as well, the process shown in FIGS. 6A to 6C is started. The process shown in FIGS. 6A to 6C may be performed by the controller 13 executing one or more programs 14a stored in the internal memory 14.

In S40, the controller 13 determines whether the standby screen 60 (see FIG. 4) is being displayed on the user I/F 17. When determining that the standby screen 60 is not being displayed on the user I/F 17 (S40: No), the controller 13 terminates the process shown in FIGS. 6A to 6C. This is because of the following reasons. In a situation where the standby screen 60 is not being displayed on the user I/F 17, the controller 13 is performing some process. Therefore, the controller 13 does not perform a below-mentioned process of changing the memory set as the storage destination or a below-mentioned process of changing the function to use the USB memory 23, until completion of the process currently in execution. When determining that the standby screen 60 is being displayed on the user I/F 17 (S40: Yes), the controller 13 goes to S41.

In S41, the controller 13 determines whether the USB storage process is currently valid. Specifically, the controller 13 refers to the validity determination flag, thereby determining whether the USB storage process is currently valid. When determining that the USB storage process is currently valid (S41: Yes), the controller 13 goes to S42. In S42, the controller 13 determines whether the USB memory 23 that has been attached to the port this time stores therein the identification information 34 paired with the encryption key 31. Specifically, the controller 13 determines whether the encrypted management information 30b is stored in the USB memory 23 attached to the port this time and whether the management information 30b is decryptable using the encryption key 31 stored in the internal memory 14. Namely, when the encrypted management information 30b is stored in the USB memory 23 attached to the port this time, and the management information 30b is decryptable using the encryption key 31 stored in the internal memory 14, the controller 13 makes an affirmative determination in S42 (S42: Yes).

When determining that the USB memory 23 that has been attached to the port this time stores therein the identification information 34 paired with the encryption key 31 (S42: Yes), the controller 13 goes to S43. In S43, the controller 13 determines whether the port to which the USB memory 23 has been attached this time is the dedicated port. Specifically, the controller 13 refers to the setting information 32, thereby determining whether the port to which the USB memory 23 has been attached this time is the dedicated port.

When determining that the port to which the USB memory 23 has been attached this time is the dedicated port (S43: Yes), the controller 13 terminates the process shown in FIGS. 6A to 6C. The MFP 10 is enabled to store print data in the storage printing function even if the dedicated memory is removed from the dedicated port and thereafter attached to the dedicated port again. Namely, when it is determined in S43 that the port to which the USB memory 23 has been attached this time is the dedicated port (S43: Yes), it is assumed that the dedicated memory has been merely re-attached after once removed by the user.

Figure 7:
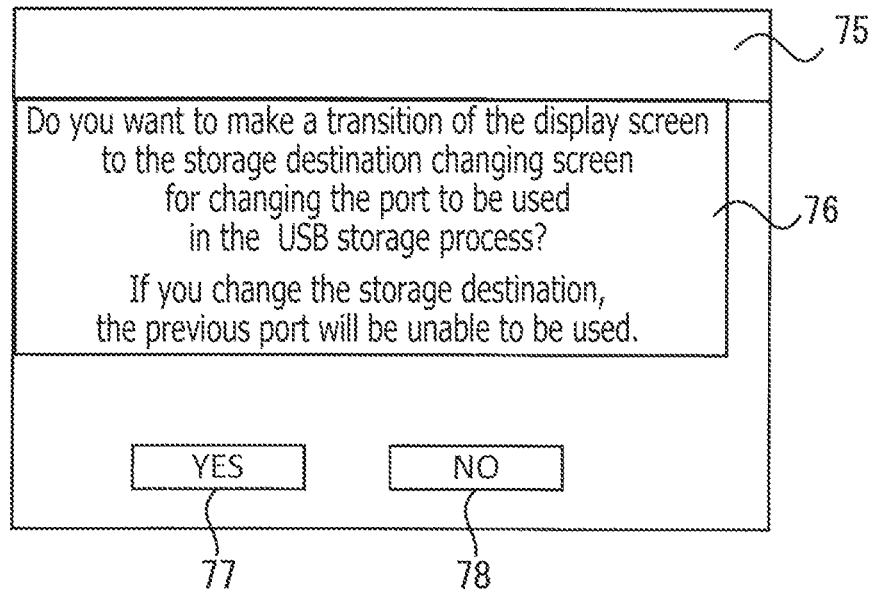
FIG. 7 shows an example of a notification screen displayed on the MFP.

When determining that the port to which the USB memory 23 has been attached this time is not the dedicated port (S43: No), the controller 13 proceeds to S44 to display a notification screen 75 (see FIG. 7) on the user I/F 17. The notification screen 43 displayed in S44 includes a message 76 for inquiring of the user whether to make a transition of the display on the user I/F 17 to a storage destination changing screen for changing the port to be used in the USB storage process. In addition, the message 76 includes a precaution that if the storage destination is changed, the port that has been heretofore set as the dedicated port will be unable to be used in the USB storage process. The notification screen 43 further includes a YES button 72 and a NO button 73. After S44, the controller 13 determines whether the YES button 72 has been selected on the notification screen 75 (S45). When the NO button 73 has been selected on the notification screen 75 (S45: No), the controller 13 terminates the process shown in FIGS. 6A to 6C. Meanwhile, when the YES button 72 has been selected on the notification screen 75 (S45: Yes), the controller 13 goes to S46.

Figure 8:
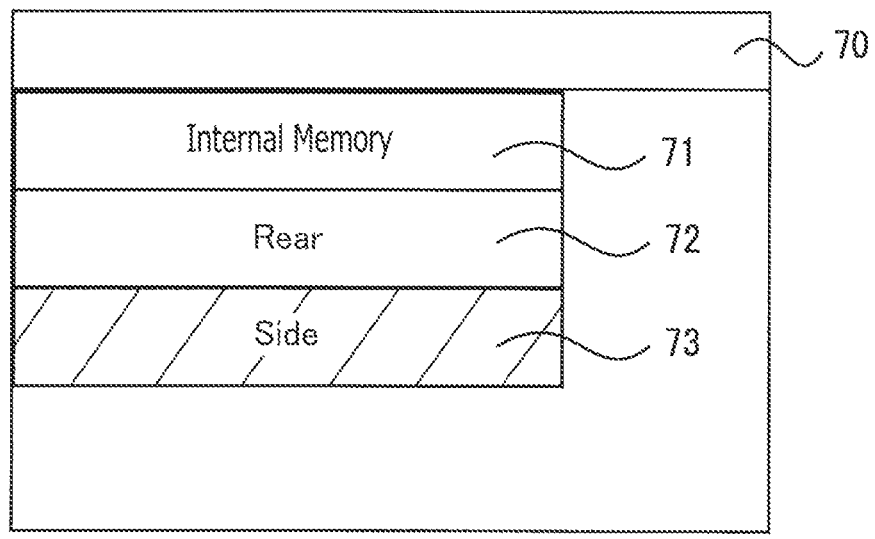
FIG. 8 shows another example of the storage destination setting screen displayed on the MFP.

In S46, the controller 13 displays the storage destination setting screen 70 on the user I/F 17. As described above, the destination setting screen 70 is a screen to receive an instruction to change the storage destination for print data to a selected one from among the internal memory 14, the port 21, and the port 22. On the storage destination setting screen 70 shown in FIG. 8, the designation button 73 associated with the port 22 currently set as the storage destination of print data is displayed in a different color from a color of the other designation buttons 71 and 72. The storage destination setting screen 70 shows which port among the plurality of ports 21 and 22 is set as the dedicated port.

In S47, the controller 13 determines whether one of the ports 21 and 22 other than the internal memory 14 has been selected on the storage destination setting screen 70. When one of the ports 21 and 22 other than the internal memory 14 has been selected on the storage destination setting screen 70 (S47: Yes), the controller 13 goes to S48. In S48, the controller 13 sets the USB storage process, for which the USB memory 23 attached to the port selected in S46 is set as the storage destination for print data. Specifically, for instance, when the user provides an instruction to select a port (e.g., the port 21) to which the dedicated memory is currently attached on the storage destination setting screen 70, the controller 13 sets, as a dedicated port, the port 21 to which the dedicated memory is currently attached. At this time, the controller 13 cancels a dedicated-port setting for the port 22 that has already been set as the dedicated port. The controller 13 updates the setting information 32 according to the newly-configured dedicated-port setting for the port 21 and the cancellation of the dedicated-port setting for the port 22.

Meanwhile, when determining in S47 that none of the ports 21 and 22 other than the internal memory 14 has been selected, i.e., that the internal memory 14 has been selected on the storage destination setting screen 70 (S47: No), the controller 13 goes to S49. In S49, the controller 13 sets the internal memory 14 as the storage destination for print data. At this time, the controller 13 sets the USB storage process invalid by cancelling the dedicated-port setting for the port 22 that has already been set as the dedicated port. After completion of S48 or S49, the controller 13 terminates the process shown in FIGS. 6A to 6C.

When determining that the USB memory 23 that has been attached to the port this time does not store therein the identification information 34 paired with the encryption key 31 (S42: No), the controller 13 goes to S50. In S50, the controller 13 determines whether the port to which the USB memory 23 has been attached this time is set as the dedicated port. Specifically, for instance, the controller 13 may refer to the setting information 32 stored in the internal memory 14, thereby determining which port is currently set as the dedicated port.

When determining that the port to which the USB memory 23 has been attached this time is set as the dedicated port (S50: Yes), the controller 13 goes to S51. In S51, the controller 13 causes the user I/F 17 to display substantially the same storage destination setting screen 70 as displayed in S46. This is because the user may have mistakenly attached the USB memory 23, which is not set as the dedicated memory, to the port set as the dedicated port.

In S52, the controller 13 determines whether one of the ports 21 and 22 other than the internal memory 14 has been selected on the storage destination setting screen 70 displayed in S51. When determining that one of the ports 21 and 22 other than the internal memory 14 has been selected on the storage destination setting screen 70 (S52: Yes), the controller 13 goes to S53. In S53, the controller 13 sets the USB storage process, for which the USB memory 23 attached to the port selected on the storage destination setting screen 70 is set as the storage destination for print data. When the port to which the USB memory 23 has been attached this time is selected on the storage destination setting screen 70 displayed in S52, the controller 13 may set the USB memory 23 attached this time as a dedicated memory. In this case as well, the controller 13 cancels a dedicated-memory setting for a USB memory 23 that has already been set as the dedicated memory. After completion of S53, the controller 13 terminates the process shown in FIGS. 6A to 6C. Meanwhile, when determining that the internal memory 14 has been selected on the storage destination setting screen 70 (S52: No), the controller 13 terminates the process shown in FIGS. 6A to 6C. This is because the USB storage process is already set valid now.

When determining that the port to which the USB memory 23 has been attached this time is not set as the dedicated port (S50: No), the controller 13 goes to S54. In S54, for instance, the controller 13 determines whether the dedicated memory has already been attached to the dedicated port. When determining that the dedicated memory has already been attached to the dedicated port (S54: Yes), the controller 13 proceeds to S55 to display a function display screen (see FIG. 9) on the user I/F 17. In S54, in another instance, the controller 13 may determine whether a USB memory 23, which is different from the USB memory 23 attached to the port this time, is attached to the dedicated port.

Figure 9:
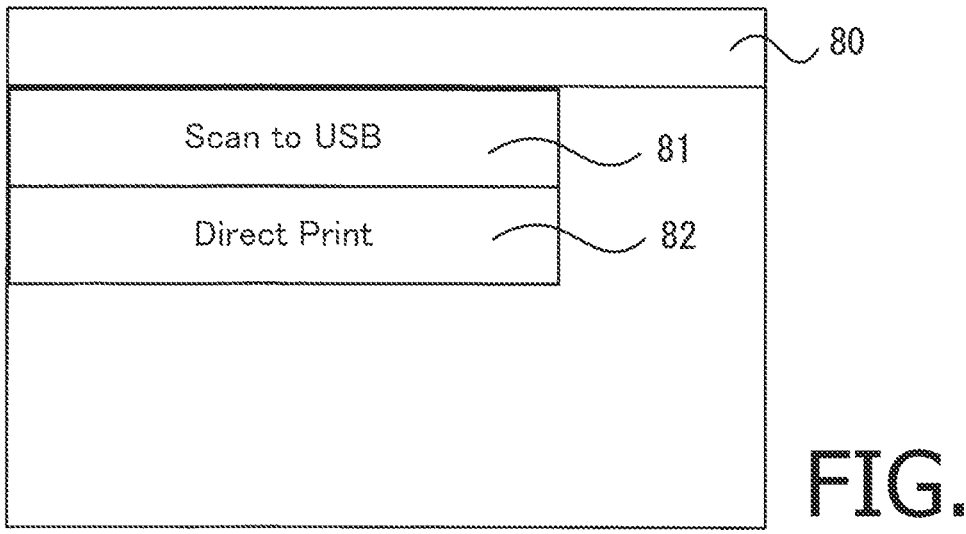
FIG. 9 shows an example of a function display screen displayed on the MFP.

The function display screen 80 shown in FIG. 9 displays thereon designation buttons 81 and 82 to receive a selection of a function using the USB memory 23 attached this time from available choices of functions. Specifically, the designation button 81 is a button to be operated to select "Scan to USB" as a function using the USB memory 23 attached this time. The function "Scan to USB" is a function to perform a process of generating scanned data by causing the scan engine 16 to scan an image of a document placed on a document table (not shown), and storing the generated scanned data into the USB memory 23 attached to the port. The designation button 82 is a button to be operated to select "Direct Print" as a function using the USB memory 23 attached this time. The function "Direct Print" is a function to perform a process of, when the USB memory 23 is attached to the port 21 or 22, displaying a list of image data stored in the attached USB memory 23 on the user I/F 17 and causing the print engine 15 to print image data selected from the displayed list. It is noted in S55, it is not possible to select "USB Storage Process" as a function using the USB memory 23 attached this time. This is because if a USB memory 23 has already been attached to the dedicated port, the user is unlikely to use the USB memory 23 attached this time, in the USB storage process.

Figure 10:
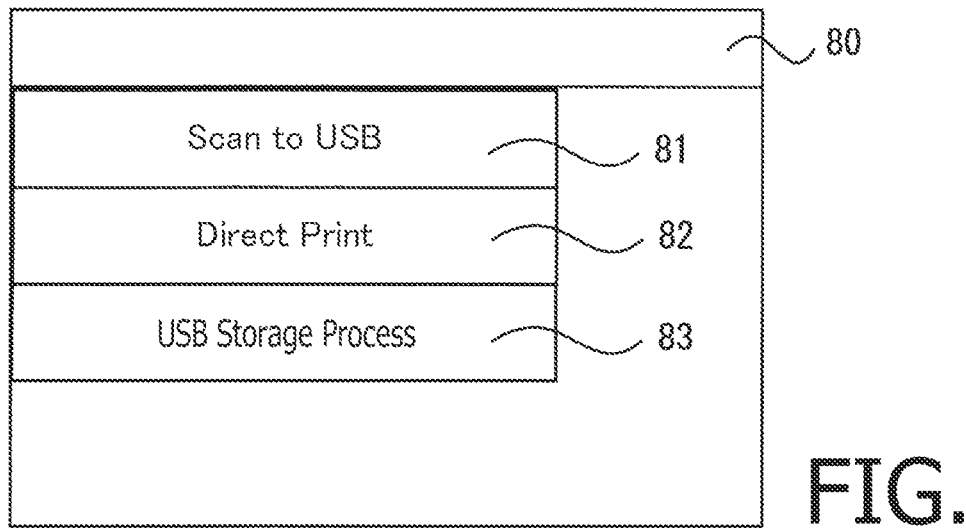
FIG. 10 shows another example of the function display screen displayed on the MFP.

On the other hand, when determining that the dedicated memory has not been attached to the dedicated port (S54: No), the controller 13 proceeds to S56 to display on the user I/F 17 the function display screen 80 shown in FIG. 10. The function display screen 80 shown in FIG. 10 displays thereon designation buttons 81, 82, and 83 to receive a selection of a function using the USB memory 23 attached this time from among available choices of functions. Specifically, in addition to substantially the same designation buttons 81 and 82 as displayed on the function display screen 80 shown in FIG. 9, the function display screen 80 shown in FIG. 10 further includes the designation button 83 to be operated to select "USB Storage Process" as a function using the USB memory 23 attached this time.

After completion of S55 or S56, the controller 13 proceeds to S57 to determine whether a selecting operation to select one of the designation buttons has been detected. When determining that a selecting operation to select one of the designation buttons has not been detected (S57: No), the controller 13 waits until a selecting operation to select one of the designation buttons is detected. Meanwhile, when determining that a selecting operation to select one of the designation buttons has been detected (S57: Yes), the controller 13 proceeds to S58 to perform a process according to the function selected on the function display screen 80. Specifically, when the USB storage process has been selected again, the controller 13 sets the USB memory 23 attached to the port this time to the dedicated memory, and sets the port to which the USB memory 23 has been attached this time to the dedicated port. In this case, the controller 13 cancels the dedicated-port setting for the port that has already been set as the dedicated port. Meanwhile, when one of the designation buttons 82 and 83 has been selected, the controller 13 switches the display on the user I/F 17 to an operation screen for using the USB memory 23 attached to the port this time in the selected function (i.e., the function associated with the selected designation button 82 or 83), and performs a process corresponding to the selected function. After completion of S58, the controller 13 terminates the process shown in FIGS. 6A to 6C.

Figure 11:
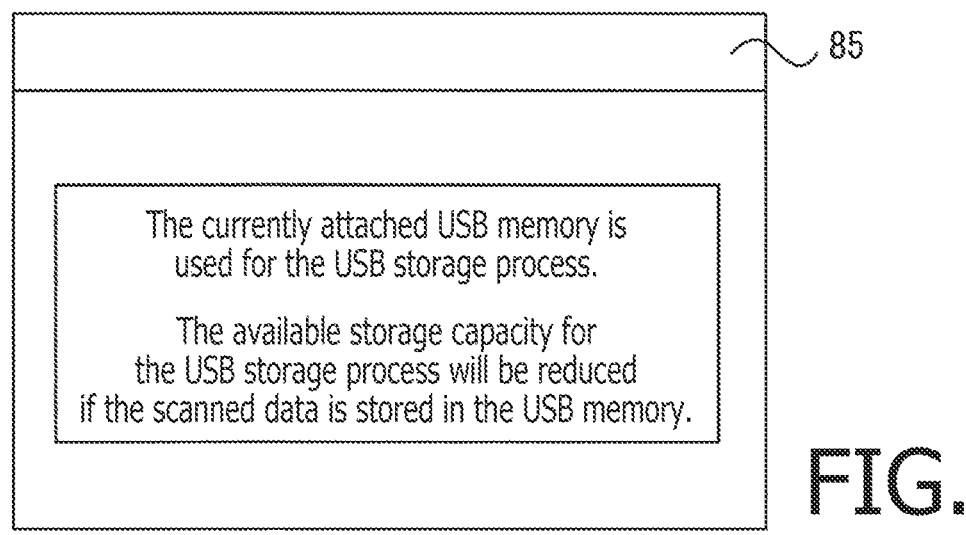
FIG. 11 shows an example of a warning screen displayed on the MFP.

When the designation button 81 has been operated on the function display screen 80 displayed in S56, the controller 13 displays a scanning screen for "Scan to USB" on the user I/F 17. When a scanning instruction has been received via the scanning screen, the controller 13 causes the scan engine 16 to scan a document to generate scanned data, and stores the scanned data into the USB memory 23 attached to the port this time. In this case, after the scanning screen has been displayed on the user I/F 17, the USB memory 23 may be attached to the port. When the identification information 34 is stored in the USB memory 23 attached to the port, the controller 13 may, for instance, display a warning screen 85 (see FIG. 11) on the user I/F 17. The warning screen 85 displays thereon a message representing that the available storage capacity for the USB storage process will be reduced if the scanned data is stored in the USB memory 23. For instance, the controller 13 may terminate the "USB storage process" after displaying the warning screen 85. In another instance, the controller 13 may display the warning screen 85 on the user I/F 17 and then receive a scanning instruction via the user I/F 17.

Meanwhile, when the designation button 82 has been operated on the function display screen 80, in "Direct Print" associated with the designation button 82, the controller 13 causes the user I/F 17 to display available choices of image data (e.g., JPEG data and PDF data) stored in the USB memory 23 and prompts the user to select one of the available choices of image data displayed, to print the selected image data. At this time, if the USB memory 23 contains print data that has been encrypted and stored in a below-mentioned process of S68, the print data is not set as target data to be printed. Moreover, the print data is not displayed as an option on the user I/F 17.

Figure 12:
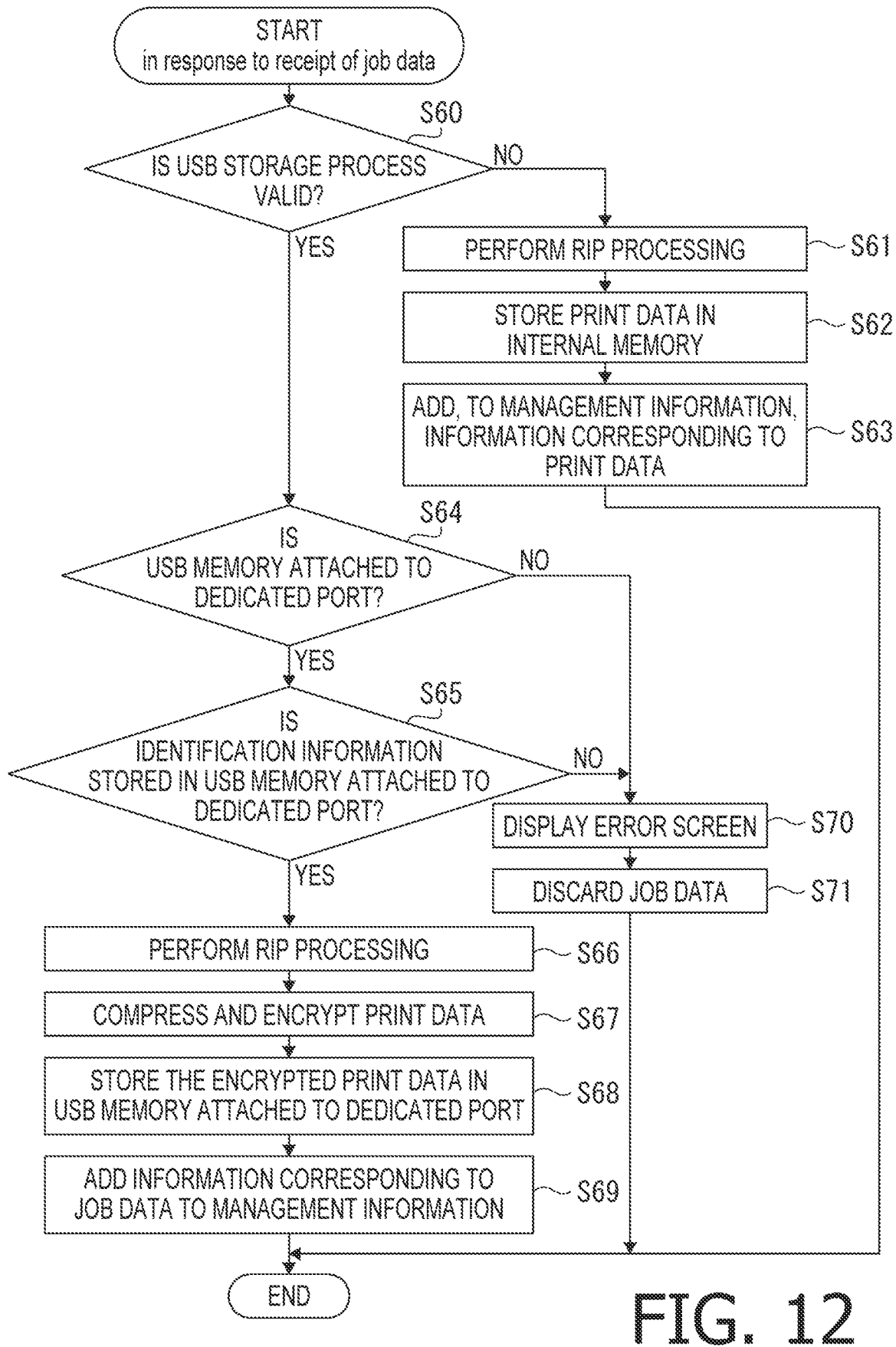
FIG. 12 is a flowchart showing a procedure of a process to store print data among processes pertaining to a storage printing function.

Next, referring to FIG. 12, an explanation will be provided of a process to be performed in response to the MFP 10 receiving job data JD, in a state where the storage printing function is set valid. Specifically, when the first storage printing function is set valid, the controller 13 starts a process shown in FIG. 12 in response to detecting that job data JD to which a PIN code is added has been received. When the second storage printing function is set valid, the controller 13 starts the process shown in FIG. 12 in response to detecting that job data JD to which a user name is added has been received. The process shown in FIG. 12 may be performed by the controller 13 executing one or more programs 14a stored in the internal memory 14.

In S60, the controller 13 determines whether the USB storage process is set valid. Specifically, as described above, the controller 13 determines whether the USB storage process is set valid, based on the validity determination flag stored in the internal memory 14. When determining that the USB storage process is set valid (S60: Yes), the controller 13 goes to S64.

In S64, the controller 13 determines whether the USB memory 23 is attached to the dedicated port. When determining that the USB memory 23 is attached to the dedicated port (S64: Yes), the controller 13 goes to S65 to determine whether the identification information 34 is stored in the USB memory 23 attached to the dedicated port. When determining that the identification information 34 is stored in the USB memory 23 attached to the dedicated port (S65: Yes), the controller 13 goes to S66 to perform RIP processing for the received job data JD. Specifically, the controller 13 rasterizes the PDL data contained in the job data JD according to contents represented by the PJL data contained in the job data, thereby generating print data.

In S67, the controller 13 compresses the print data generated in S66, and then encrypts the compressed print data. At this time, the controller 13 encrypts the print data using the encryption key generated in S27 of FIG. 3C. In S68, the controller 13 stores the print data encrypted in S67 in the USB memory 23 (i.e., the dedicated memory) attached to the port set as the dedicated port. In S68, the controller 13 encrypts the print data in a format un-processable in "Direct Print."

In S69, the controller 13 reads out the management information 30b from the USB memory 23 storing the print data, decrypts the read management information 30B, and adds information corresponding to the job data JD received this time to the decrypted management information 30b. Specifically, the controller 13 decrypts the management information 30b stored in the USB memory 23 using an encryption key. When the first storage printing function is set valid, a job name, a data name, and reception date and time are stored as a single record in the management information 30b in association with the PIN code contained in the job data JD. On the other hand, when the second storage printing function is set valid, the job name, the data name, and the reception date and time are stored as a single record in the management information 30b in association with the user name contained in the job data JD. Thereby, the MFP 10 is enabled to manage each record in the management information 30b in association with corresponding print data stored in the internal memory 14.

When determining that the USB memory 23 is not attached to the dedicated port (S64: No), the controller 13 goes to S70. In S70, the controller 13 causes the user I/F 17 to display an error screen providing a notification that the USB memory 23 is not attached to the dedicated port. For instance, the error screen displayed in S70 displays thereon a message representing that the job data JD is unable to be stored because the USB memory 23 is not attached to the dedicated port. When a close button has been operated on the error screen, the error screen is hidden. In S70, instead of being displayed on the user I/F 17, the error screen may be displayed on the PC 24 as a sending source of the job data JD. In this case, the controller 13 may communicate with the PC 24 to send image data corresponding to the error screen and a request for displaying the error screen to the PC 24.

In S71, the controller 13 discards the job data received this time. After completion of S71, the controller 13 terminates the process shown in FIG. 12. In S71, instead of discarding the job data JD received this time, the controller 13 may store the job data JD in the internal memory 14 in response to a user instruction.

When determining that the USB storage process is set invalid (S60: No), the controller 13 goes to S61. In S61, the controller 13 performs RIP processing to convert the job data JD into the print data. The RIP processing performed in S61 is substantially the same as the RIP processing performed in S66.

In S62, the controller 13 stores the print data generated this time in the internal memory 14. Namely, in S62, unlike S68, the controller 13 does not store the encrypted print data. In S62, the controller 13 may compress the print data to reduce a data volume of the print data and then store the compressed print data in the internal memory 14. In S63, the controller 13 adds information corresponding to the print data generated this time to the management information 30a stored in the internal memory 14. In S63, the controller 13 stores the job name, the data name, and the reception date and time as a single record in the management information 30a, in association with the user name or the PIN code depending on whether the second storage printing function is set valid or invalid.

Figure 13A:
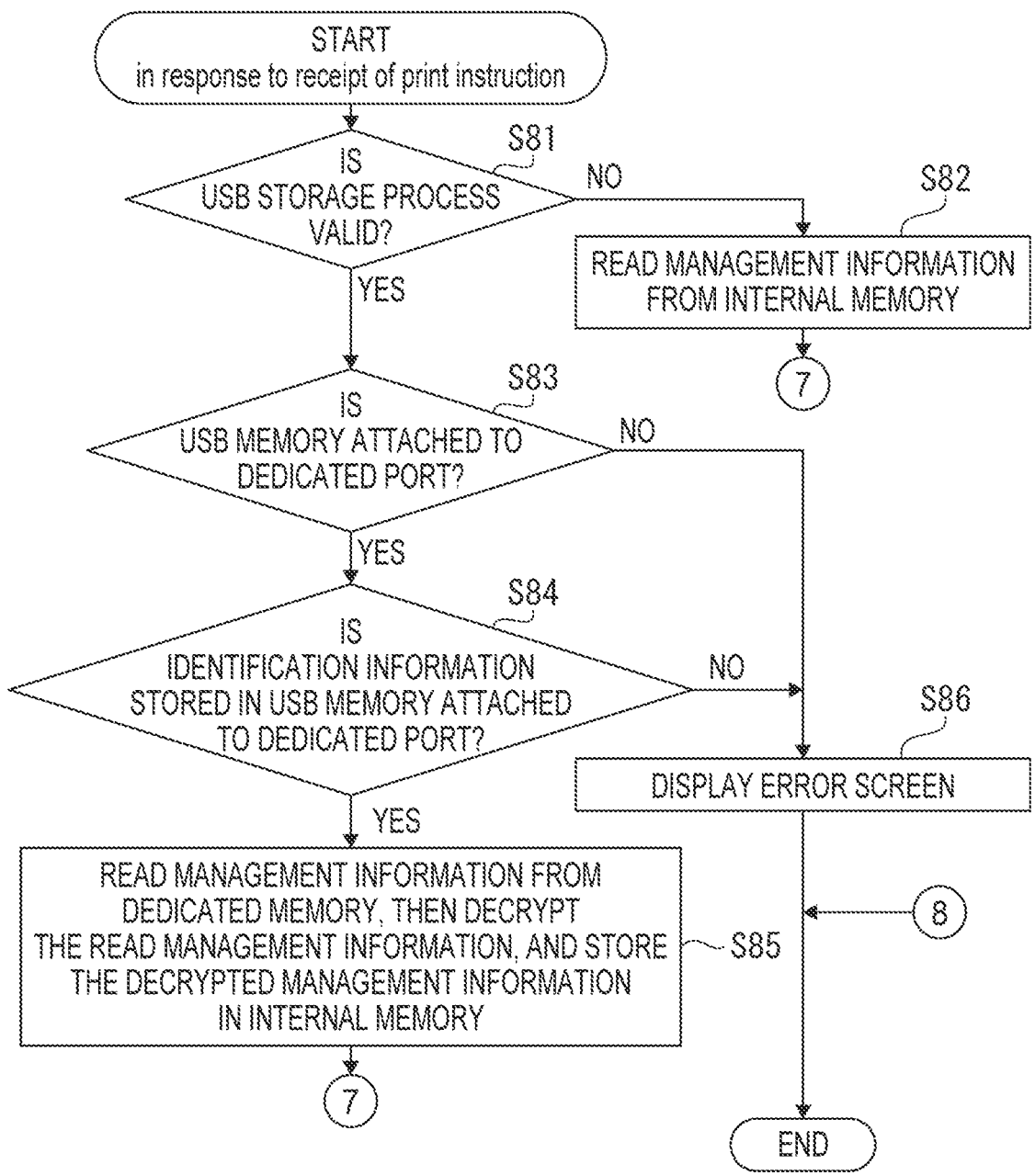
FIGS. 13A and 13B are flowcharts showing a procedure of a process to print the print data among the processes pertaining to the storage printing function.
Figure 13B:
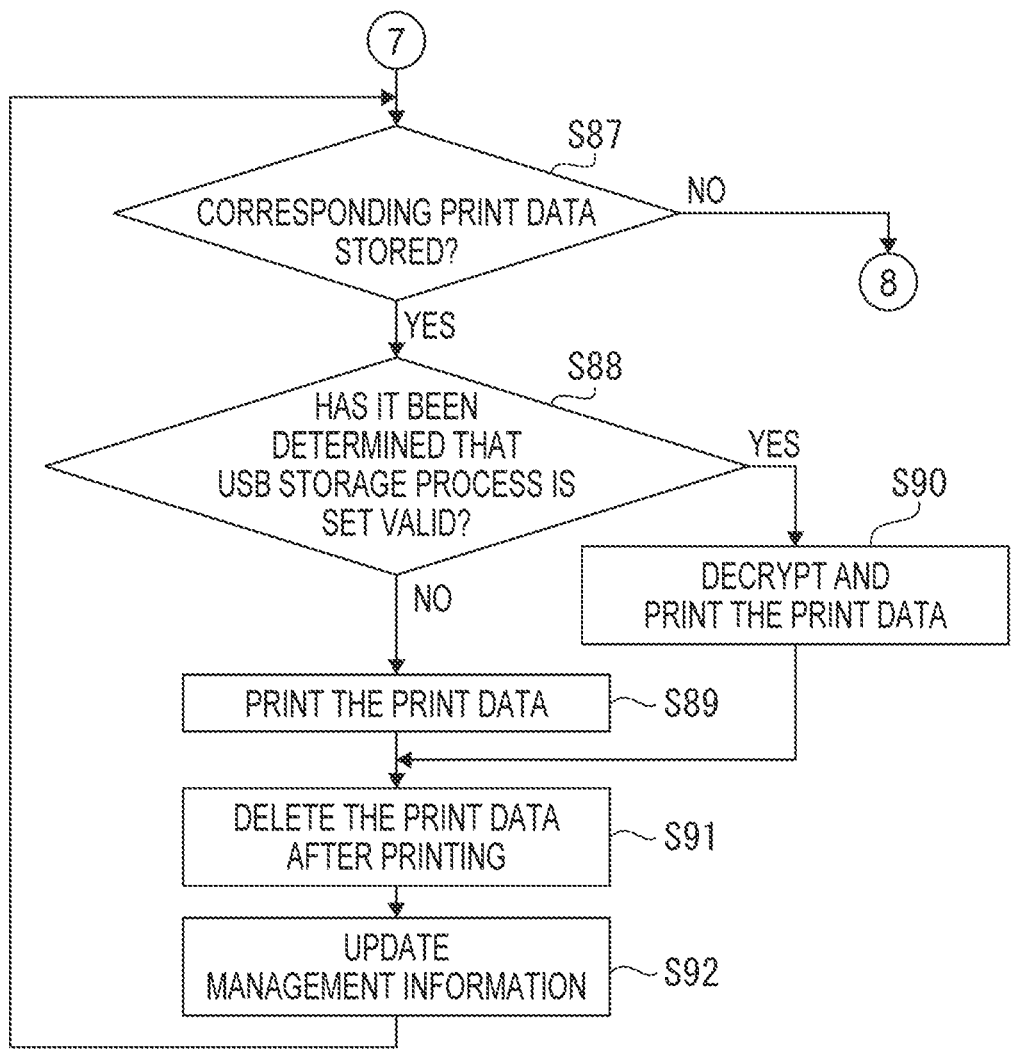

Next, a procedure for printing the print data stored in the internal memory 14 or the USB memory 23 will be described with reference to FIGS. 13A and 13B. FIGS. 13A and 13B are flowcharts showing a procedure of a process to be performed by the controller 13 upon receipt of a print instruction for the print data via the user I/F 17. Specifically, when a print instruction operation has been received via the standby screen 60 displayed on the user I/F 17, the controller 13 starts the process shown in FIGS. 13A and 13B. Moreover, when the second storage printing function is set valid, in response to receiving a login operation to the MFP 10 via the user I/F 17 and determining that login authentication is successful, the controller 13 starts the process shown in FIGS. 13A and 13B. The process shown in FIGS. 13A and 13B may be performed by the controller 13 executing one or more programs 14a stored in the internal memory 14.

In S81, the controller 13 determines whether the USB storage process is set valid, based on the value of the validity determination flag. When determining that the USB storage process is set invalid (S81: No), the controller 13 proceeds to S82 to read out the management information 30a stored in the internal memory 14. As described above, when the first storage printing function is set valid, and the USB storage process is set invalid, the management information 30a includes a list of print data to each of which a corresponding PIN code is added. Meanwhile, when the second storage printing function is set valid, and the USB storage process is set invalid, the management information 30a includes a list of print data to each of which a corresponding user name is added.

On the other hand, when determining that the USB storage process is set valid (S81: Yes), the controller 13 proceeds to S83 to determine whether the USB memory 23 is attached to the dedicated port. When determining that the USB memory 23 is attached to the dedicated port (S83: Yes), the controller 13 proceeds to S84 to determine whether the identification information 34 is stored in the USB memory 23 attached to the dedicated port.

When determining that the identification information 34 is stored in the USB memory 23 attached to the dedicated port (S84: Yes), the controller 13 proceeds to S85. In S85, the controller 13 reads out the management information 30b from the dedicated memory (i.e., the USB memory 23 attached to the dedicated port), then decrypts the management information 30b using the encryption key 31, and stores the decrypted management information 30b into the internal memory 14.

In S87, using the management information 30 read out in S82 or S85, the controller 13 determines whether print data corresponding to the current function (i.e., the first storage printing function or the second storage printing function) is stored in the corresponding memory (i.e., the internal memory 14 or the dedicated memory). Specifically, when the first storage printing function is set valid, the controller 13 causes the user I/F 17 to display a screen for prompting the user to input the PIN code, and determines whether the same PIN code as input by the user is stored in the management information 30. Meanwhile, when the second storage printing function is set valid, the controller 13 determines whether the user name of the login user is stored in the management information 30. When determining that print data corresponding to the current function is not stored in the memory (S87: No), the controller 13 terminates the process shown in FIGS. 13A and 13B. When the second storage printing function is set valid, the controller 13 may start the process shown in FIGS. 13A and 13B upon receipt of a login operation via the standby screen 60. Moreover, in response to receipt of a print instruction operation via the standby screen 60 in a state where the login operation has already been accepted, the controller 13 may start the process shown in FIGS. 13A and 13B. Further, the controller 13 may accept the login operation in S87. Furthermore, the controller 13 may start the process shown in FIGS. 13A and 13B after receiving the PIN code when the second storage printing function is set valid. In this case, the acceptance of the login operation may be omitted in S87.

On the other hand, when determining that print data corresponding to the current function is stored in the memory (S87: Yes), the controller 13 goes to S88. In S88, the controller 13 determines whether it has been determined in S81 that the USB storage process is set valid. When determining in S88 that it has been determined in S81 that the USB storage process is set valid (S88: Yes), the controller 13 goes to S90. Meanwhile, when determining in S88 that it has been determined in S81 that the USB storage process is set invalid (S88: No), the controller 13 goes to S89. In S89 and S90, by referring to the management information 30, the controller 13 selects print data associated with the PIN code or the user name of the login user among the print data stored in the corresponding memory (i.e., the internal memory 14 or the dedicated memory), and prints the selected print data. In S90, more specifically, the controller 13 decrypts the print data stored in the dedicated memory, using the encryption key 31, and then causes the print engine 15 to print the decrypted print data.

After completion of S89 or S90, the controller 13 goes to S91. In S91, the controller 13 deletes the print data which the controller 13 has caused the print engine 15 to print in S89 or S90. More specifically, the controller 13 deletes the print data, and temporary data generated in the printing process. In S92, the controller 13 deletes from the management information 30 information (i.e., a record) associated with the printed print data, thereby updating the management information 30. It is noted that the controller 13 may perform the process of S92 after printing all the print data associated with the input PIN code or for the login user.

After completion of S92, the controller 13 goes back to S87. When determining in S87 that print data corresponding to the current function is stored in the memory (S87: Yes), the controller 13 repeatedly performs the processes of S88 to S92. Then, when all the print data for the login user has been printed, the controller 13 determines in S87 that print data corresponding to the current function is not stored in the memory (S87: No), and terminates the process shown in FIGS. 13A and 13B. When the controller 13 returns from S92 to S87, if the first storage printing function is set valid, it is considered that the PIN code has already been input by the user. Therefore, in this case, the controller 13 may not need to accept an input of the PIN code again in S87.

In S83, when determining that the USB memory 23 is not attached to the dedicated port (S83: No), the controller 13 goes to S86. Moreover, when determining that the identification information 34 is not stored in the USB memory 23 attached to the dedicated port (S84: No), the controller 13 goes to S86. In S86, the controller 13 displays an error screen providing a notification that the USB memory 23 is not attached. Specifically, the error screen includes a message representing that print data is unable to be read since the dedicated memory is not attached to the dedicated port. For instance, the error screen displayed in S86 may be hidden in response to a close button being operated on the error screen. After execution of S86, the controller 13 terminates the process shown in FIGS. 13A and 13B.

As described above, the illustrative embodiment produces the following advantageous effects. When a USB memory 23 is attached to one of the ports 21 and 22, the controller 13 provides a notification if the dedicated memory is attached to the port not set as the dedicated port. Accordingly, the user is allowed to recognize a port attachment status of the USB memory 23, for instance, thereby re-attaching the dedicated memory as needed. Consequently, it is possible to improve user-friendliness of the image forming apparatus having the plurality of ports.

The controller 13 causes the user I/F 17 to display which port is currently set as the dedicated port on the storage destination setting screen 70. Thereby, since it is displayed on the user I/F 17 which port is the previously-set dedicated port, for instance, it is possible to assist the user in re-attaching the dedicated memory to the dedicated port.

The controller 13 receives a selection instruction via the storage destination setting screen 70 displayed after the display of the notification screen 75, thereby setting the port to which the dedicated memory is currently attached as the dedicated port. Thus, it is possible to set the port to which the dedicated memory is currently attached to the dedicated port, after the user recognizes that the dedicated memory has been attached to the port not set as the dedicated port. Accordingly, it is possible to flexibly set the storage destination for print data according to the user's preference.

In response to receipt of a user's selection instruction to select the port to which the dedicated memory is currently attached from among the available choices displayed on the storage destination setting screen 70, the controller 13 sets the port to which the dedicated memory is currently attached as the dedicated port. Thus, since the dedicated port is set after the receipt of the user's selection instruction, it is possible to prevent the setting of the dedicated port from being changed unexpectedly.

In response to receipt of a selection instruction to set the internal memory 14 as the storage destination via the storage destination setting screen 70, the controller 13 sets the internal memory 14 as the storage destination for print data, and cancels the dedicated-port setting for the port currently set as the dedicated port. Thereby, the storage destination for print data is changed to the internal memory 14. Thus, it is possible to flexibly set the memory to be used for the USB storage process. In this case, the controller 13 may set invalid the identification information 34 stored in the USB memory 23 set as the dedicated memory, thereby cancelling the dedicated-memory setting for the USB memory 23 set as the dedicated memory. Methods for setting invalid the identification information 34 stored in the USB memory 23 may include, but are not limited to, initializing the USB memory 23, deleting the identification information 34 from the USB memory 23, moving the identification information 34 from the USB memory 23 to another storage location, rewriting the identification information 34 into invalid information, and adding to the identification information 34 information indicating that the identification information 34 is invalid. Further, the controller 13 may set the setting information 32 invalid, thereby cancelling the dedicated-port setting for the port set as the dedicated port. Methods for setting the setting information 32 invalid may include, but are not limited to, deleting the setting information 32 from the internal memory 14, moving the setting information 32 from the internal memory 14 to another storage location, rewriting the setting information 32 into invalid information, and adding to the setting information 32 information indicating that the setting information 32 is invalid.

In setting the port to which the dedicated memory is attached as the dedicated port, the controller 13 causes the user I/F 17 to display information that the port currently set as the dedicated port will not be usable as the dedicated port. This enables the user to recognize that the port currently set as the dedicated port will not be usable as the dedicated port.

When the USB memory 23 not set as the dedicated memory has been attached to a port different from the dedicated port, the controller 13 causes the user I/F 17 to display "USB Storage Process," "Scan to USB," and "Direct Print" as available choices of functions. When "USB Storage Process" has been selected, the controller 13 sets the USB memory 23, which is not set as the dedicated memory, to dedicated memory, and sets the port, to which the said USB memory 23 has been attached, to the dedicated port. Meanwhile, when "Scan to USB" or "Direct Print" has been selected, the controller 13 performs a process corresponding to the selected function, using the port to which the USB memory 23 not set to the dedicated memory has been attached and the USB memory 23. Thereby, it is possible to further improve the user-friendliness of the image forming apparatus.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein.

When the dedicated memory is attached to one of the plurality of ports, and the dedicated port is not yet set, the controller 13 may cause the user I/F 17 to display functions different from the storage printing function as available choices of functions using the dedicated memory. In this case, when determining in S42 (see FIG. 6A) that the USB memory 23 that has been attached to the port this time stores therein the identification information 34 (S42: Yes), the controller 13 proceeds to S43, in which the controller 13 may determine whether the internal memory 14 is set as the storage destination for print data (i.e., whether the dedicated port is set). In this case, when determining in S43 that the internal memory 14 is not set as the storage destination for print data (S43: No), the controller 13 may proceed to S46, in which the controller 13 may display functions different from the storage printing function, as available choices of functions using the dedicated memory. The "functions different from the storage printing function" may include, but are not limited to, "Scan to USB" and "Direct Print." Thereby, it is possible to further improve the user-friendliness of the image forming apparatus.

In the aforementioned illustrative embodiment, when the dedicated memory is attached to a port not set as the dedicated port, the controller 13 causes the user I/F 17 to display the storage destination setting screen 70 (see FIG. 8) in S46 of FIG. 6B and receives a user's selection instruction to select the storage destination for print data via the storage destination setting screen 70. In another instance, when determining in S43 that the internal memory 14 is not set as the storage destination for print data (S43: No), the controller 13 may proceed to S48 without receiving a user's selection instruction. Then, in S48, the controller 13 may set the port to which the dedicated memory is attached to the dedicated port. In this case, the processes of S44 to S47, and S49 may be omitted.

Figure 14:
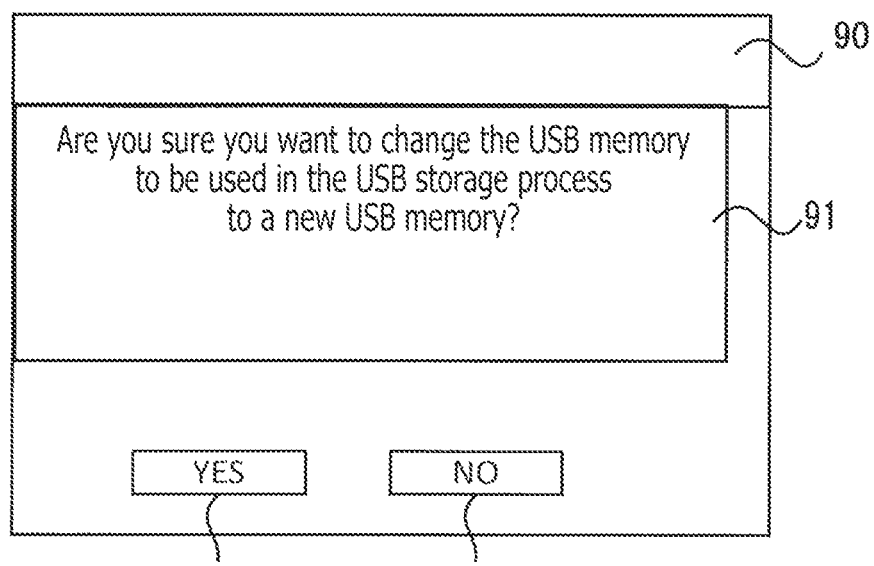
FIG. 14 shows an example of a confirmation screen displayed on the MFP.

In S51 (see FIG. 6A), instead of displaying the storage destination setting screen 70, the controller 13 may display a confirmation screen 90 shown in FIG. 14. The confirmation screen 90 may display thereon a message 91 for inquiring of the user whether to change the USB memory 23 used in the USB storage process to a new USB memory 23, a YES button 92, and a NO button 93. In response to detecting that the YES button 92 has been operated on the confirmation screen 90 displayed in S51, the controller 13 may proceed to S53 to set the USB memory 23 attached to the port this time to the storage destination to be used in the USB storage process. Meanwhile, in response to detecting that the NO button 93 has been operated on the confirmation screen 90, the controller 13 may terminate the process shown in FIGS. 6A to 6C.

In the aforementioned illustrative embodiment, the MFP 10 has been described as an example of the image forming apparatus according to aspects of the present disclosure. Nonetheless, besides the MFP 10, examples of the image forming apparatus may include a printer without the scan engine 16. In the aforementioned illustrative embodiment, the port 22 is disposed at the left-side portion of the front section 41 (see FIG. 1). In another instance, the port 22 may be disposed at a front-side portion of the front section 41, i.e., on the same side of the front section 41 as the side on which the user I/F 17 is disposed. Moreover, the MFP 10 may have three or more ports. In the aforementioned illustrative embodiment, in S42 (see FIG. 6A), the controller 13 determines whether the management information 30 decryptable by the encryption key 31 is stored in the USB memory 23. Instead, in S27 (see FIG. 3C), the controller 13 may generate a unique numerical value as determination information and store the generated unique numerical value in the USB memory 23. In S28, the controller 13 may store the same numerical value as generated in S27 in the internal memory 14 as the identification information. In S42 (see FIG. 6A), the controller 13 may determine whether the numerical value stored in the USB memory 23 matches the numerical value stored in the internal memory 14. In this case, when determining that the numerical value stored in the USB memory 23 matches the numerical value stored in the internal memory 14 (S42: Yes), the controller 13 may proceed to S43. Meanwhile, when determining that the numerical value stored in the USB memory 23 does not match the numerical value stored in the internal memory 14 (S42: No), the controller 13 may proceed to S50. The controller 13 may store the print data in the USB memory 23 without encrypting the print data. In this case, S67 in FIGS. 12 and S90 in FIG. 13B may be omitted.

The following shows examples of associations between elements exemplified in the aforementioned illustrative embodiments and modifications and elements according to aspects of the present disclosure. The MFP 10 may be an example of an "image forming apparatus" according to aspects of the present disclosure. The print engine 15 may be an example of a "print engine" according to aspects of the present disclosure. The user I/F 17 may be an example of a "user interface" according to aspects of the present disclosure. The memory I/Fs 11 and 12 may be included in examples of a "memory interface" according to aspects of the present disclosure. The ports 21 and 22 may be included in a "plurality of ports" according to aspects of the present disclosure. The controller 13 may be an example of a "controller" according to aspects of the present disclosure.

The internal memory 14 may be an example of an "internal memory" according to aspects of the present disclosure. The internal memory 14 storing the programs 14a may be an example of a "non-transitory computer-readable medium storing computer-readable instructions" according to aspects of the present disclosure. "USB Storage Process" displayed on the function display screen 80 may be an example of a "first choice" for a "storage printing process" according to aspects of the present disclosure. "Scan to USB" and "Direct Print" displayed on the function display screen 80 may be included in examples of a "second choice" for a "process different from the storage printing process" according to aspects of the present disclosure.

What is claimed is:

1. An image forming apparatus comprising:
   a print engine;
   a user interface;
   a memory interface having a plurality of ports, each port being configured to receive a portable memory removably attached thereto; and
   a controller configured to:
      perform a portable memory using process comprising:
         storing specific data for the portable memory using process in a dedicated memory, the dedicated memory being a portable memory set as a storage destination to store the specific data in the portable memory using process when attached to a dedicated port among the plurality of ports; and
         performing a process using the specific data stored in the dedicated memory in response to an operation received via the user interface;
      prior to the portable memory using process, set one of the plurality of ports as the dedicated port;
      in response to a target portable memory being attached to one of the plurality of ports, determine whether the target portable memory is the dedicated memory and the port to which the target portable memory has been attached is the dedicated port;
      provide a notification when determining that the target portable memory is the dedicated memory but the port to which the target portable memory has been attached is not the dedicated port; and
      after providing the notification, set as the dedicated port the port to which the dedicated memory is currently attached.

2. The image forming apparatus according to claim 1, wherein the controller is further configured to:
   perform a portable-memory-using printing process comprising:
      storing image data in the dedicated memory; and
      causing the print engine to perform printing according to the image data stored in the dedicated memory; and
   prior to the portable-memory-using printing process, set one of the plurality of ports as the dedicated port.

3. The image forming apparatus according to claim 1, wherein the controller is further configured to:
   in providing the notification, cause the user interface to display which port, among the plurality of ports, is set as the dedicated port.

4. The image forming apparatus according to claim 1, wherein the controller is further configured to:
   in providing the notification, cause the user interface to display available choices including the plurality of ports; and
   set, as the dedicated port, the port to which the dedicated memory is currently attached, in response to receipt of an instruction to select the port to which the dedicated memory is currently attached from among the available choices displayed on the user interface.

5. The image forming apparatus according to claim 4, further comprising an internal memory,
   wherein the portable memory using process further comprises:
      storing the specific data in the internal memory; and
      performing a process using the specific data stored in the internal memory, in response to an operation received via the user interface, and
   wherein the controller is further configured to:
      in providing the notification, cause the user interface to display the available choices including the internal memory; and
      in response to receipt of an instruction to select the internal memory from among the available choices displayed on the user interface, set the internal memory as the storage destination for the specific data, and cancel a dedicated-port setting for a port currently set as the dedicated port.

6. The image forming apparatus according to claim 1, wherein the controller is further configured to:
   before setting, as the dedicated port, the port to which the dedicated memory is currently attached, cause the user interface to show that a port that has been heretofore set as the dedicated port will be unable to be used as the dedicated port.

7. The image forming apparatus according to claim 1, wherein the controller is further configured to:
   store identification information in the target portable memory, thereby setting the target portable memory as the dedicated memory; and
   determine that the target portable memory storing the identification information is set as the dedicated memory.

8. The image forming apparatus according to claim 7, wherein the controller is further configured to:
   store determination information associated with the identification information, and setting information indicating which port among the plurality of ports is set as the dedicated port; and
   determine that the target portable memory storing the identification information associated with the determination information is set as the dedicated memory.

9. The image forming apparatus according to claim 8, wherein the controller is further configured to:
   when providing the notification, cause the user interface to display which port, among the plurality of ports, is set as the dedicated port, based on the setting information.

10. The image forming apparatus according to claim 8, wherein the controller is further configured to:
    set the setting information invalid, thereby cancelling a dedicated-port setting for a port currently set as the dedicated port.

11. The image forming apparatus according to claim 1, further comprising a non-transitory computer-readable medium storing computer-readable instructions that are configured to, when executed by the controller, cause the controller to:
    perform the portable memory using process;
    prior to the portable memory using process, set one of the plurality of ports as the dedicated port;
    in response to the target portable memory being attached to one of the plurality of ports, determine whether the target portable memory is the dedicated memory and the port to which the target portable memory has been attached is the dedicated port;
provide the notification when determining that the target portable memory is the dedicated memory but the port to which the target portable memory has been attached is not the dedicated port; and
after providing the notification, set as the dedicated port the port to which the dedicated memory is currently attached.

12. An image forming apparatus comprising:
a print engine;
a user interface;
a memory interface having a plurality of ports, each port being configured to receive a portable memory removably attached thereto; and
a controller configured to:
  perform a portable memory using process comprising:
    storing specific data for the portable memory using process in a dedicated memory, the dedicated memory being a portable memory set as a storage destination to store the specific data in the portable memory using process when attached to a dedicated port among the plurality of ports; and
    performing a process using the specific data stored in the dedicated memory in response to an operation received via the user interface;
  prior to the portable memory using process, set one of the plurality of ports as the dedicated port;
  in response to a target portable memory being attached to one of the plurality of ports, determine whether the target portable memory is the dedicated memory and the port to which the target portable memory has been attached is the dedicated port;
  provide a notification when determining that the target portable memory is the dedicated memory but the port to which the target portable memory has been attached is not the dedicated port; and:
  when the dedicated memory is attached to one of the plurality of ports, and the dedicated port is not yet set, cause the user interface to display processes different from the portable memory using process as available choices of processes using the dedicated memory.

13. The image forming apparatus according to claim 12, wherein the controller is further configured to:
  perform a portable-memory-using printing process comprising:
    storing image data in the dedicated memory; and
    causing the print engine to perform printing according to the image data stored in the dedicated memory; and
  prior to the portable-memory-using printing process, set one of the plurality of ports as the dedicated port.

14. An image forming apparatus comprising:
a print engine;
a user interface;
a memory interface having a plurality of ports, each port being configured to receive a portable memory removably attached thereto; and
a controller configured to:
  perform a portable memory using process comprising:
    storing specific data for the portable memory using process in a dedicated memory, the dedicated memory being a portable memory set as a storage destination to store the specific data in the portable memory using process when attached to a dedicated port among the plurality of ports; and
    performing a process using the specific data stored in the dedicated memory in response to an operation received via the user interface;
  prior to the portable memory using process, set one of the plurality of ports as the dedicated port;
  in response to a target portable memory being attached to one of the plurality of ports, determine whether the target portable memory is the dedicated memory and the port to which the target portable memory has been attached is the dedicated port;
  provide a notification when determining that the target portable memory is the dedicated memory but the port to which the target portable memory has been attached is not the dedicated port;
  when determining that the target portable memory is not the dedicated memory and the port to which the target portable memory has been attached is not the dedicated port, cause the user interface to display a first choice for the portable memory using process and a second choice for a process different from the portable memory using process, the first choice being a choice to receive an instruction to set, to the dedicated port, the port to which the target portable memory not set as the dedicated memory has been attached;
  when the first choice has been selected, set to the dedicated memory the target portable memory not set as the dedicated memory, and set to the dedicated port the port to which the target portable memory has been attached; and
  when the second choice has been selected, set the target portable memory that is not set as the dedicated memory to be used in the different process associated with the second choice.

15. The image forming apparatus according to claim 14, wherein the controller is further configured to:
  perform a portable-memory-using printing process comprising:
    storing image data in the dedicated memory; and
    causing the print engine to perform printing according to the image data stored in the dedicated memory; and
  prior to the portable-memory-using printing process, set one of the plurality of ports as the dedicated port.

16. An image forming apparatus comprising:
a print engine;
a user interface;
a memory interface having a plurality of ports, each port being configured to receive a portable memory removably attached thereto; and
a controller configured to:
  perform a portable memory using process comprising:
    storing specific data for the portable memory using process in a dedicated memory, the dedicated memory being a portable memory set as a storage destination to store the specific data in the portable memory using process when attached to a dedicated port among the plurality of ports; and
    performing a process using the specific data stored in the dedicated memory in response to an operation received via the user interface;
  prior to the portable memory using process, set one of the plurality of ports as the dedicated port;
  in response to a target portable memory being attached to one of the plurality of ports, determine whether the target portable memory is the dedicated memory and the port to which the target portable memory has been attached is the dedicated port;

provide a notification when determining that the target portable memory is the dedicated memory but the port to which the target portable memory has been attached is not the dedicated port;

store identification information in the target portable memory, thereby setting the target portable memory as the dedicated memory;

determine that the target portable memory storing the identification information is set as the dedicated memory;

store determination information associated with the identification information, and setting information indicating which port among the plurality of ports is set as the dedicated port;

determine that the target portable memory storing the identification information associated with the determination information is set as the dedicated memory;

generate an encryption key associated with the target portable memory to be set as the dedicated memory, the encryption key being the determination information;

generate management information for the specific data to be stored in the dedicated memory, encrypt the generated management information with the encryption key, and store the encrypted management information in the target portable memory to be set as the dedicated memory, the encrypted management information being the identification information;

when the encrypted management information stored in the target portable memory is decryptable with the encryption key, determine that the target portable memory, storing the encrypted management information decryptable with the encryption key, is set as the dedicated memory; and when updating the management information, decrypt the encrypted management information with the encryption key, update the decrypted management information, and encrypt the updated management information with the encryption key.

17. The image forming apparatus according to claim 16, wherein the controller is further configured to:
perform a portable-memory-using printing process comprising:
storing image data in the dedicated memory; and
causing the print engine to perform printing according to the image data stored in the dedicated memory; and
prior to the portable-memory-using printing process, set one of the plurality of ports as the dedicated port.

18. The image forming apparatus according to claim 16, wherein the controller is further configured to:
when providing the notification, cause the user interface to display which port, among the plurality of ports, is set as the dedicated port, based on the setting information.

19. The image forming apparatus according to claim 16, wherein the controller is further configured to:
set the setting information invalid, thereby cancelling a dedicated-port setting for a port currently set as the dedicated port.

20. An image forming apparatus comprising:
a print engine;
a user interface;
a memory interface having a plurality of ports, each port being configured to receive a portable memory removably attached thereto; and
a controller configured to:
perform a portable memory using process comprising:
storing specific data for the portable memory using process in a dedicated memory, the dedicated memory being a portable memory set as a storage destination to store the specific data in the portable memory using process when attached to a dedicated port among the plurality of ports; and
performing a process using the specific data stored in the dedicated memory in response to an operation received via the user interface;
prior to the portable memory using process, set one of the plurality of ports as the dedicated port;
in response to a target portable memory being attached to one of the plurality of ports, determine whether the target portable memory is the dedicated memory and the port to which the target portable memory has been attached is the dedicated port;
provide a notification when determining that the target portable memory is the dedicated memory but the port to which the target portable memory has been attached is not the dedicated port;
store identification information in the target portable memory, thereby setting the target portable memory as the dedicated memory;
determine that the target portable memory storing the identification information is set as the dedicated memory; and
set invalid the identification information stored in the target portable memory set as the dedicated memory, thereby cancelling a dedicated-memory setting for the target portable memory set as the dedicated memory.

21. The image forming apparatus according to claim 20, wherein the controller is further configured to:
perform a portable-memory-using printing process comprising:
storing image data in the dedicated memory; and
causing the print engine to perform printing according to the image data stored in the dedicated memory; and
prior to the portable-memory-using printing process, set one of the plurality of ports as the dedicated port.

22. The image forming apparatus according to claim 20, wherein the controller is further configured to:
store determination information associated with the identification information, and setting information indicating which port among the plurality of ports is set as the dedicated port; and
determine that the target portable memory storing the identification information associated with the determination information is set as the dedicated memory.

23. The image forming apparatus according to claim 22, wherein the controller is further configured to:
when providing the notification, cause the user interface to display which port, among the plurality of ports, is set as the dedicated port, based on the setting information.

24. The image forming apparatus according to claim 22, wherein the controller is further configured to:
set the setting information invalid, thereby cancelling a dedicated-port setting for a port currently set as the dedicated port.

* * * * *